(12) United States Patent
Penfield et al.

(10) Patent No.: US 12,020,193 B1
(45) Date of Patent: Jun. 25, 2024

(54) VISION-BASED HAND GRIP RECOGNITION METHOD AND SYSTEM FOR INDUSTRIAL ERGONOMICS RISK IDENTIFICATION

(71) Applicant: VelocityEHS Holdings, Inc., Chicago, IL (US)

(72) Inventors: Julia Penfield, Seattle, WA (US); Francis Seunghyun Baek, Ann Arbor, MI (US); Richard Thomas Barker, West Chester, OH (US); Daeho Kim, Toronto (CA); SangHyun Lee, Ann Arbor, MI (US)

(73) Assignee: VELOCITYEHS HOLDINGS, INC, Chicago, IL (US)

( * ) Notice: Subject to any disclaimer, the term of this patent is extended or adjusted under 35 U.S.C. 154(b) by 0 days.

(21) Appl. No.: 18/457,855

(22) Filed: Aug. 29, 2023

(51) Int. Cl.
G06T 7/70 (2017.01)
G06Q 10/0635 (2023.01)
G06Q 10/0639 (2023.01)
G06V 10/764 (2022.01)
G06V 40/10 (2022.01)

(52) U.S. Cl.
CPC ... *G06Q 10/0635* (2013.01); *G06Q 10/06398* (2013.01); *G06T 7/70* (2017.01); *G06V 10/764* (2022.01); *G06V 40/11* (2022.01)

(58) Field of Classification Search
CPC ........ G06T 7/70; G06V 40/10; G06V 10/764; G06Q 10/0635; G06Q 10/06398
See application file for complete search history.

(56) References Cited

U.S. PATENT DOCUMENTS

| | | | |
|---|---|---|---|
| 7,804,998 | B2 | 9/2010 | Mundermann et al. |
| 8,139,067 | B2 | 3/2012 | Anguelov et al. |
| 8,180,714 | B2 | 5/2012 | Corazza et al. |
| 8,384,714 | B2 | 2/2013 | De Aguiar et al. |
| 11,324,439 | B2 | 5/2022 | Diaz-Arias et al. |
| 11,482,048 | B1 * | 10/2022 | Diaz-Arias ............... G06T 7/75 |

(Continued)

FOREIGN PATENT DOCUMENTS

WO 2009140261 A1 11/2009

OTHER PUBLICATIONS

Kim, Taehyung, and Hyolyun Roh. "Analysis of risk factors for work-related musculoskeletal disorders in radiological technologists." Journal of physical therapy science 26.9 (Year: 2014).*

(Continued)

*Primary Examiner* — Shaghayegh Azima
(74) *Attorney, Agent, or Firm* — K&L Gates LLP

(57) ABSTRACT

A system, comprising: a computing device configured to obtain video signals of a worker performing a hand-related job at a workplace; and a computing server system configured to receive and process the video signals to identify hand grips and wrist bending involved in the job, determine a hand grip type for each identified hand grip, obtain force information relating to each identified hand grip, determine neutral or hazardous wrist bending based at least upon the wrist bending and the hand grip force information, calculate a percent maximum strength for each identified hand grip, calculate frequencies and durations of each identified hand grip and wrist bending, and determine ergonomic risks of the hand-related job accordingly.

17 Claims, 15 Drawing Sheets

(56) References Cited

U.S. PATENT DOCUMENTS

| | | | |
|---|---|---|---|
| 11,763,235 B1* | 9/2023 | Penfield | G06F 40/205 |
| | | | 704/9 |
| 2008/0031512 A1* | 2/2008 | Mundermann | G06V 40/23 |
| | | | 382/154 |
| 2008/0180448 A1* | 7/2008 | Anguelov | G06T 13/40 |
| | | | 345/475 |
| 2010/0020073 A1 | 1/2010 | Corazza et al. | |
| 2011/0208444 A1* | 8/2011 | Solinsky | A61B 5/1114 |
| | | | 702/41 |
| 2020/0327465 A1* | 10/2020 | Baek | G06N 3/045 |
| 2022/0079510 A1 | 3/2022 | Robillard et al. | |
| 2022/0237537 A1* | 7/2022 | Baek | G06Q 10/063114 |
| 2022/0386942 A1* | 12/2022 | Diaz-Arias | A61B 5/7203 |

OTHER PUBLICATIONS

Hwang et al. "A deep learning-based method for grip strength prediction: Comparison of multilayer perceptron and polynomial regression approaches"; NIH (Year: 2021).*

Kim, T, and Hyolyun R. "Analysis of risk factors for work-related musculoskeletal disorders in radiological technologists." Journal of physical therapy science 26.9 (Year: 2014).*

Muendermann et al.; A New Accurate Method of 3D Full Body Motion Capture for Animation; Standford Office of Technology Licensing, https://techfinder.stanford.edu/technology/new-accurate-method-3d-full-body-motion-capture-animation.

Markerless Motion Capture, BioMotion Laboratory Mechanical Engineering, Stanford University, http://web.stanford.edu/group/biomotion/markerless.html.

Automatic Generation of Human Models for Motion Capture, Biomechanics and Animation, ioMotion Laboratory Mechanical Engineering, Stanford University, https://techfinder.stanford.edu/technology/automatic-generation-human-models-motion-capture-biomechanics-and-animation.

Mesh-based Performance Capture from Multi-view Video, BioMotion Laboratory Mechanical Engineering, Stanford University, https://techfinder.stanford.edu/technology/mesh-based-performance-capture-multi-view-video.

Anguelov et al., SCAPE: Shape Completion and Animation of People, In ACM Transactions on Graphics (TOG) (vol. 24, No. 3, pp. 408-416). ACM.

Corazza et al. A markerless motion capture system to study musculoskeletal biomechanics: visual hull and simulated annealing approach, Annals of Biomedical Engineering, 2006,34(6):1019-29.

Corazza et al., A Framework For The Functional Identification Of Joint Centers Using Markerless Motion Capture, Validation For The Hip Joint, Journal of Biomechanics, 2007.

Mündermann et al., The Evolution of methods for the capture of human movement leading to markerless motion capture for biomechanical applications. Journal of NeuroEngineering and Rehabilitation, 3(1), 2006.

Mündermann, et al., Accurately measuring human movement using articulated ICP with soft-joint constraints and a repository of articulated models, CVPR 2007.

Robson, Motion-capture system adds costume to the drama, New Scientist, Technology, May 29, 2008.

De Aguia et al., Performance capture from sparse multi-view video. ACM Trans. Graph. 27, 3 (Aug. 2008), 1-10. https://doi.org/10.1145/1360612.1360697.

Rahman, et al. WERA: an observational tool develop to investigate the physical risk factor associated with WMSDs, Journal of human ergology 40 (1_2) (2011) 19-36.

Li et al. Applying the Brief survey in Taiwan's high-tech industries, International Journal of the Computer, The Internet and Management 11 (2) (2003) 78.

* cited by examiner

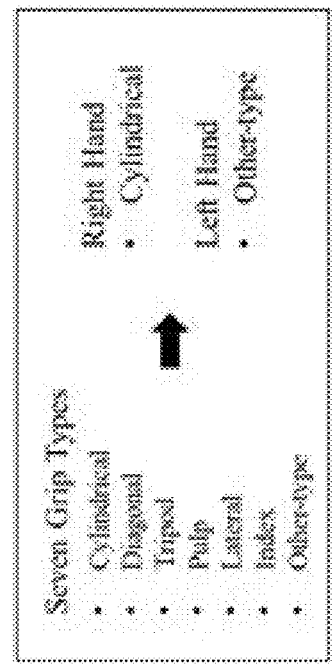

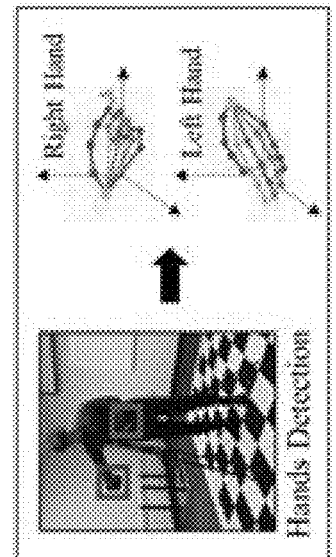

| 7 Activities of Handling Tools | | | |
|---|---|---|---|
| # | Tools | Left Grip | Right Grip |
| 1 | Drill | Other-type | Cylindrical |
| 2 | Hammer w/ Nail | Index | Diagonal |
| 3 | Driver w/ Nail | Pulp | Diagonal |
| 4 | Scissors w/ Wire | Lateral | Tripod |
| 5 | Ranch w/ Nail | Pulp | Lateral |
| 6 | Pen | Index | Tripod |
| 7 | Hammer | Other-type | Cylindrical |

402

| 7 Activities of Random Movements | | | |
|---|---|---|---|
| # | Tools | Left Grip | Right Grip |
| 1 | Hammer, Driver | Cylindrical | Cylindrical |
| 2 | Hammer, Driver | Diagonal | Diagonal |
| 3 | Pen, Scissors | Tripod | Tripod |
| 4 | Nails | Pulp | Pulp |
| 5 | Ranches | Lateral | Lateral |
| 6 | - | Index | Index |
| 7 | - | Other-type | Other-type |

| Hand Grip Types | 560 Videos for Training Classifier | | 168 Videos for Testing Framework | |
|---|---|---|---|---|
| | Duration (min) | # of Frames | Duration (min) | # of Frames |
| Cylindrical | 60 | 108,655 | 16 | 29,512 |
| Diagonal | 60 | 108,715 | 16 | 29,444 |
| Tripod | 60 | 108,515 | 16 | 29,500 |
| Pulp | 61 | 109,176 | 16 | 29,446 |
| Lateral | 60 | 108,540 | 16 | 29,401 |
| Index | 60 | 108,428 | 16 | 29,481 |
| Other-type | 60 | 108,559 | 16 | 29,512 |
| Total | 423 | 760,588 | 115 | 206,296 |
FIG. 9
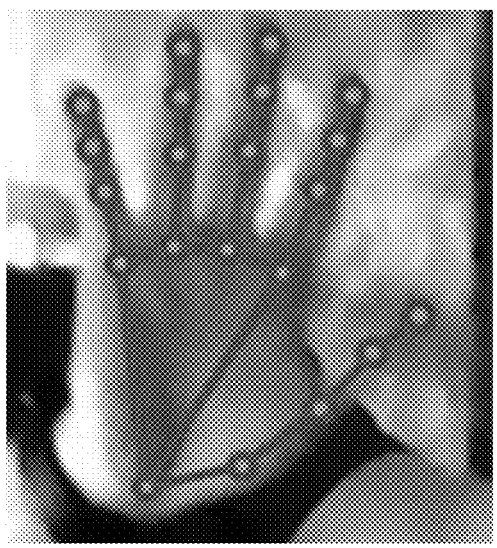
FIG. 10(A)
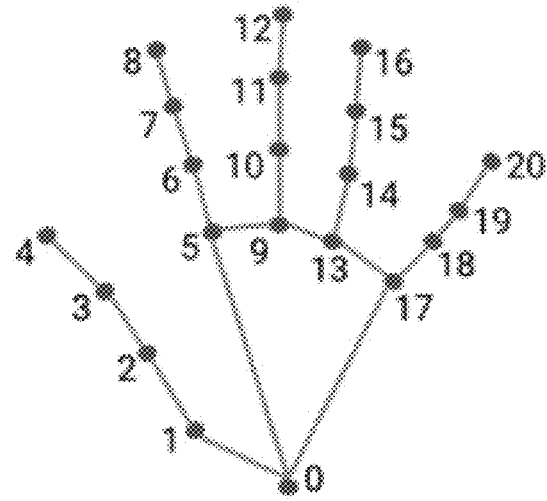
FIG. 10(B)

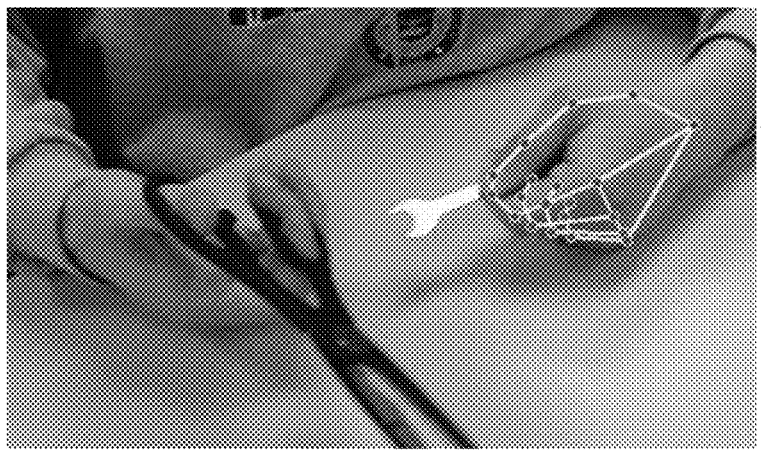
FIG. 11
| Hand Grip Types | # of Original Frames | # of Collected Data | Detection Rate |
|---|---|---|---|
| Cylindrical | 108,655 | 93,328 | 0.8589 |
| Diagonal | 108,715 | 96,693 | 0.8894 |
| Tripod | 108,515 | 100,870 | 0.9295 |
| Pulp | 109,176 | 106,227 | 0.9730 |
| Lateral | 108,540 | 106,680 | 0.9829 |
| Index | 108,428 | 103,553 | 0.9550 |
| Other-type | 108,559 | 104,118 | 0.9591 |
| Total | 760,588 | 711,469 | 0.9354 |
FIG. 12
FIG. 13(A)    FIG. 13(B)    FIG. 13(C)
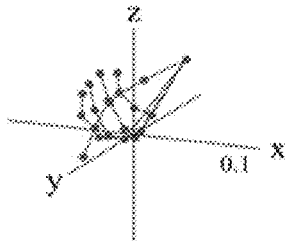 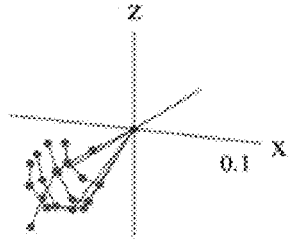 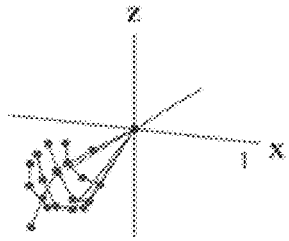
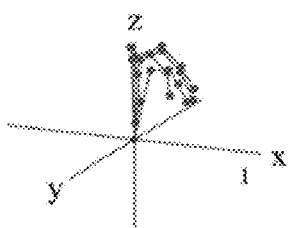 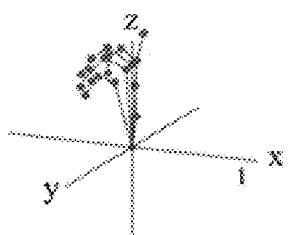 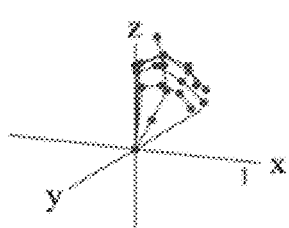
FIG. 13(D)    FIG. 13(E)    FIG. 13(F)

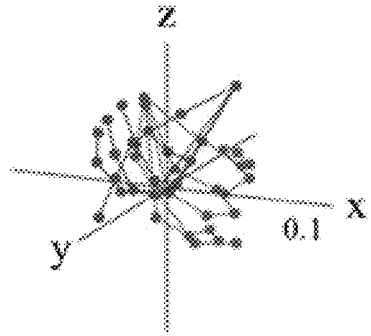
FIG. 14(A)
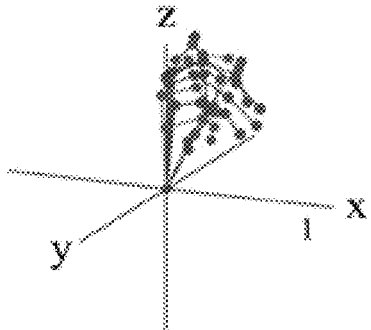
FIG. 14(B)
● Right Hand    ● Left Hand
| Hand Grip Types | # of Training Data | # of Validation Data | Total |
|---|---|---|---|
| Cylindrical | 74,662 | 18,666 | 93,328 |
| Diagonal | 77,354 | 19,339 | 96,693 |
| Tripod | 80,696 | 20,174 | 100,870 |
| Pulp | 84,982 | 21,245 | 106,227 |
| Lateral | 85,344 | 21,336 | 106,680 |
| Index | 82,842 | 20,711 | 103,553 |
| Other-type | 83,294 | 20,824 | 104,118 |
| Total | 569,175 | 142,294 | 711,469 |
FIG. 15
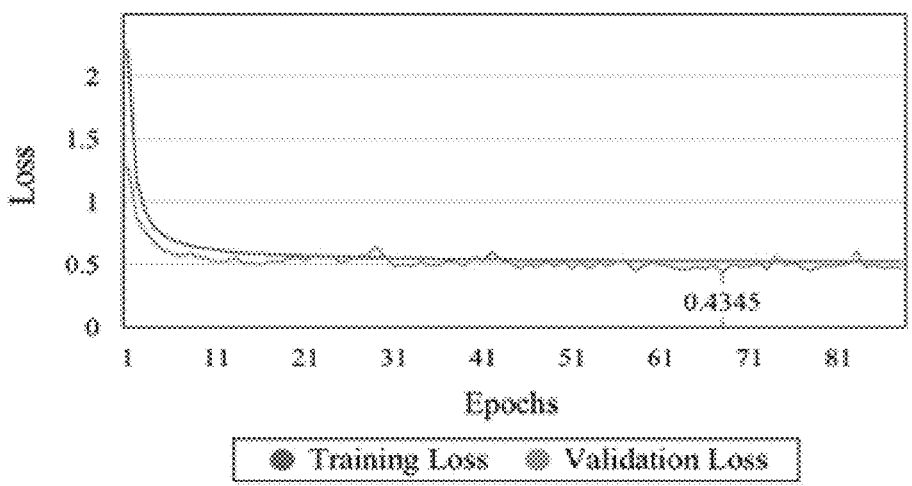
FIG. 16

| Hand Grip Types | # of Original Frames | # of Post-processed Data | Detection Rate |
|---|---|---|---|
| Cylindrical | 29,512 | 25,863 | 0.8764 |
| Diagonal | 29,444 | 26,787 | 0.9098 |
| Tripod | 29,500 | 27,969 | 0.9481 |
| Pulp | 29,446 | 28,741 | 0.9761 |
| Lateral | 29,401 | 28,743 | 0.9776 |
| Index | 29,481 | 28,022 | 0.9505 |
| Other-type | 29,512 | 28,581 | 0.9685 |
| Total | 206,296 | 194,706 | 0.9438 |

| Total Test Video Duration | Threshold For Recognition | Recognized Duration (min) | Correctly Recognized Duration (min) | Avg. Recall | Avg. Precision | Rate of Recognized Duration |
|---|---|---|---|---|---|---|
| 115 mins (206,296 frames) | 0.1 | 108 | 91 | 0.7908 | 0.8379 | 0.9438 |
| | 0.2 | 108 | 91 | 0.7908 | 0.8379 | 0.9438 |
| | 0.3 | 108 | 91 | 0.7897 | 0.8408 | 0.9391 |
| | 0.4 | 105 | 90 | 0.7824 | 0.8529 | 0.9173 |
| | 0.5 | 100 | 88 | 0.7637 | 0.8739 | 0.8739 |
| | 0.6 | 93 | 84 | 0.7345 | 0.8988 | 0.8172 |
| | 0.7 | 87 | 80 | 0.7004 | 0.9211 | 0.7604 |
| | 0.8 | 79 | 75 | 0.6552 | 0.9413 | 0.6961 |
| | 0.9 | 69 | 66 | 0.5798 | 0.9599 | 0.6040 | though
VISION-BASED HAND GRIP RECOGNITION METHOD AND SYSTEM FOR INDUSTRIAL ERGONOMICS RISK IDENTIFICATION

FIELD OF TECHNOLOGY

The present disclosure generally relates to identifying and analyzing ergonomic risks at the workplace, and more particularly relates to vision-based methods and systems configured to identify industrial ergonomics risks associated with hand grips.

BACKGROUND

Musculoskeletal disorders generally refer to a common type of work related illness and have been recognized as a major cause of absence among working populations. Conditions that are caused or exacerbated by activities at the workplace are often labeled as work-related musculoskeletal disorders (WMSDs) and are characterized by discomfort of nerves, tendons, muscles, and supporting structures of the body. WMSDs can affect the ability of workers to perform the required occupational activities which could have a negative effect on productivity. WMSDs and their relation to lost workdays in the health care industry have been studied and found to account for a substantial portion of the WMSD burden on society. According to some studies, WMSDs of the hand and wrist are associated with the longest absences from work and are, therefore, associated with greater lost productivity and wages than those of other anatomical regions.

In order to minimize the risk of workers developing hand related WMSDs, it is crucial to conduct an effective workplace risk assessment from an ergonomic standpoint. Most employers do not have ergonomics expertise and rely on subject matter experts (SMEs) to administer questionnaires and observe the workplace. However, it is often a time-consuming process from dispatching ergonomics SMEs to workplaces to waiting for risk assessment reports based on observations. With questionnaires, observational assessment tools, expert evaluations, and job-exposure matrices, employers may have a sufficient number of tools to conduct risk assessment, but each tool comes with a number of limitations that leave the risk assessment incomplete.

Accordingly, it is desirable to develop a method and system equipped with computer vision and machine learning capabilities to automatically perform ergonomics risk identification and assessment of a number of hand grips based on the video recordings of employees performing various work tasks in any industrial setup.

SUMMARY

Among other features, the present disclosure relates to a system deployed within a Cloud-based communication network. In one aspect, the system may comprise a computing device, comprising: a non-transitory computer-readable storage medium configured to store an application program; and a processor coupled to the non-transitory computer-readable storage medium and configured to control a plurality of modules to execute instructions of the application program to obtain video signals of a worker performing a hand-related job at a workplace. The system may further comprise a computing server system configured to: receive the video signals, process the video signals to identify one or more hand grips and wrist bending involved in the hand-related job, determine a hand grip type of each identified hand grip, obtain hand grip force information relating to each identified hand grip, determine neutral or hazardous wrist bending based at least upon the wrist bending and the hand grip force information, calculate a percent maximum strength for each identified hand grip, calculate a first frequency and duration of each identified hand grip, calculate a second frequency and duration of each identified wrist bending, and determine ergonomic risks of the hand-related job based at least upon the percent maximum strength for each identified hand grip, the first frequency and duration of each identified hand grip, and the second frequency and duration of each identified wrist bending.

In one embodiment, the computing server system may be configured to process the video signals by obtaining one or more image frames from the video signals and using a deep learning model to perform a 3-dimensional hand pose estimation in each image frame, and use the deep learning model to perform a hand grip classification of each identified hand grip in a number of selected categories. The number of selected categories may include a cylindrical hand grip, a diagonal volar hand grip, a tripod hand grip, a pulp hand grip, a lateral hand grip, an index pointing, and an other-type hand grip.

In another embodiment, the computing server system may be further configured to display at least one image of each identified hand grip to a user and prompt the user to enter the hand grip force information relating to each identified hand grip based on the at least one image, obtain the video signals of the worker performing the hand-related job via a sensor-less motion capture process, and provide ergonomic risk control recommendations to mitigate the ergonomic risks.

In accordance with another aspect, the present disclosure relates to computer-implemented method, comprising: obtaining, by a processor of a computing device deployed within a Cloud-based communication network, video signals of a worker performing a hand-related job at a workplace; receiving, by a computing server system deployed within the Cloud-based communication network, the video signals; processing, by the computing server system, the video signals to identify one or more hand grips and wrist bending involved in the hand-related job; determining, by the computing server system, a hand grip type of each identified hand grip; obtaining, by the computing server system, hand grip force information relating to each identified hand grip; determining, by the computing server system, neutral or hazardous wrist bending based at least upon the wrist bending and the hand grip force information; calculating, by the computing server system, a percent maximum strength for each identified hand grip; calculating, by the computing server system, a first frequency and duration of each identified hand grip; calculating, by the computing server system, a second frequency and duration of each identified wrist bending; and determining, by the computing server system, ergonomic risks of the hand-related job based at least upon the percent maximum strength for each identified hand grip, the first frequency and duration of each identified hand grip, and the second frequency and duration of each identified wrist bending.

In an embodiment, the processing, by the computing server system, the video signals may include obtaining one or more image frames from the video signals and using a deep learning model to perform a 3-dimensional hand pose estimation in each image frame. The method may further comprise using, by the computing server system, the deep learning model to perform a hand grip classification of each identified hand grip in a number of selected categories. The number of selected categories may include a cylindrical hand grip, a diagonal volar hand grip, a tripod hand grip, a pulp hand grip, a lateral hand grip, an index pointing, and an other-type hand grip.

In another embodiment, the method may further comprise displaying at least one image of each identified hand grip to a user; and prompting the user to enter the hand grip force information relating to each identified hand grip based on the at least one image.

Moreover, the video signals of the worker performing the hand-related job may be obtained via a sensorless motion capture process. The method may further comprise providing, by the computing server system, ergonomic risk control recommendations to mitigate the ergonomic risks.

In yet another aspect, the present disclosure relates to a non-transitory computer readable medium storing computer executable instructions for a system deployed within a Cloud-based communication network, the instructions being configured for: obtaining, by a processor of a computing device deployed within the Cloud-based communication network, video signals of a worker performing a hand-related job at a workplace; receiving, by a computing server system deployed within the Cloud-based communication network, the video signals; processing, by the computing server system, the video signals to identify one or more hand grips and wrist bending involved in the hand-related job; determining, by the computing server system, a hand grip type of each identified hand grip; obtaining, by the computing server system, hand grip force information relating to each identified hand grip; determining, by the computing server system, neutral or hazardous wrist bending based at least upon the wrist bending and the hand grip force information; calculating, by the computing server system, a percent maximum strength for each identified hand grip; calculating, by the computing server system, a first frequency and duration of each identified hand grip; calculating, by the computing server system, a second frequency and duration of each identified wrist bending; and determining, by the computing server system, ergonomic risks of the hand-related job based at least upon the percent maximum strength for each identified hand grip, the first frequency and duration of each identified hand grip, and the second frequency and duration of each identified wrist bending.

In one embodiment, the instructions for identifying, by the computing server system, the one or more hand grips and wrist bending involved in the hand-related job may further comprise instructions for: obtaining one or more image frames from the video signals; using a deep learning model to perform a 3-dimensional hand pose estimation in each image frame; and using, by the computing server system, the deep learning model to perform a hand grip classification of each identified hand grip in a number of selected categories. The number of selected categories may include a cylindrical hand grip, a diagonal volar hand grip, a tripod hand grip, a pulp hand grip, a lateral hand grip, an index pointing, and an other-type hand grip.

In an additional embodiment, the non-transitory computer readable medium may comprise instructions for: displaying at least one image of each identified hand grip to a user; prompting the user to enter the hand grip force information relating to each identified hand grip based on the at least one image; and providing, by the computing server system, ergonomic risk control recommendations to mitigate the ergonomic risks, wherein the video signals of the worker performing the hand-related job are obtained via a sensorless motion capture process.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2(A) illustrates that the system of FIG. 1 obtains a red-green-blue (RGB) image from a video recording via a sensorless motion capture process, according to an exemplary aspect of the present disclosure;

FIG. 2(B) illustrates 3-dimensional (3D) hand pose estimation results of the RGB image of FIG. 2(A), according to an exemplary aspect of the present disclosure;

FIG. 2(C) illustrates hand grip classification results based on the 3D hand pose estimation results of the RGB image of FIG. 2(A), according to an exemplary aspect of the present disclosure;

FIG. 4 illustrates 14 activities while a worker is handling various tools using his or her hands, according to an exemplary aspect of the present disclosure;

FIG. 9 illustrates that the system of FIG. 1 obtains a number of training videos recording different hand grip types, according to an exemplary aspect of the present disclosure;

FIG. 10(A) illustrates a palm detection model generated for detecting hand joints locations in an image, according to an exemplary aspect of the present disclosure;

FIG. 10(B) illustrates a hand landmark model generated based on the hand joints locations of FIG. 10(A), according to an exemplary aspect of the present disclosure;

FIG. 11 illustrates that the system of FIG. 1 detects and estimates hand joints of the left hand in an image while failing to detect hand joints of the right hand in the image, according to an exemplary aspect of the present disclosure;

FIG. 12 illustrates the number of data obtained from the training videos of FIG. 9 and detection rates of a number of hand grips based on the data by the system of FIG. 1, according to an exemplary aspect of the present disclosure;

FIG. 13(A) illustrates random orientations of hand joint coordinates that are not normalized by the system of FIG. 1, according to an exemplary aspect of the present disclosure;

FIG. 13(B) illustrates that coordinates of an identified wrist are translated into an origin in 3D space by the system of FIG. 1, according to an exemplary aspect of the present disclosure;

FIG. 13(C) illustrates that the system of FIG. 1 normalizes the random hand joint coordinates of FIG. 13(A) based on the origin of FIG. 13(B), according to an exemplary aspect of the present disclosure;

FIG. 13(D) illustrates that the system of FIG. 1 aligns coordinates of a first reference hand joint with Z-axis, according to an exemplary aspect of the present disclosure;

FIG. 13(E) illustrates that the system of FIG. 1 aligns coordinates of a second reference hand joint with Y-axis, according to an exemplary aspect of the present disclosure;

FIG. 13(F) illustrates that the system of FIG. 1 replaces X-coordinates of all hand joints with their absolute values, according to an exemplary aspect of the present disclosure;

FIG. 14(A) illustrates that random orientations of hand joint coordinates of both left and right hands that are originally obtained by the system of FIG. 1, according to an exemplary aspect of the present disclosure;

FIG. 14(B) illustrates hand joint coordinates of both left and right hands that are transformed by the system of FIG. 1 in accordance with FIGS. 13(B)-13(F), according to an exemplary aspect of the present disclosure;

FIG. 15 illustrates hand grip data used by the system of FIG. 1 to train and validate a hand grip classifier of the system, according to an exemplary aspect of the present disclosure;

FIG. 16 illustrates training loss and validation loss of the hand grip classifier of FIG. 15, according to an exemplary aspect of the present disclosure;

DETAILED DESCRIPTION

Figure 1:
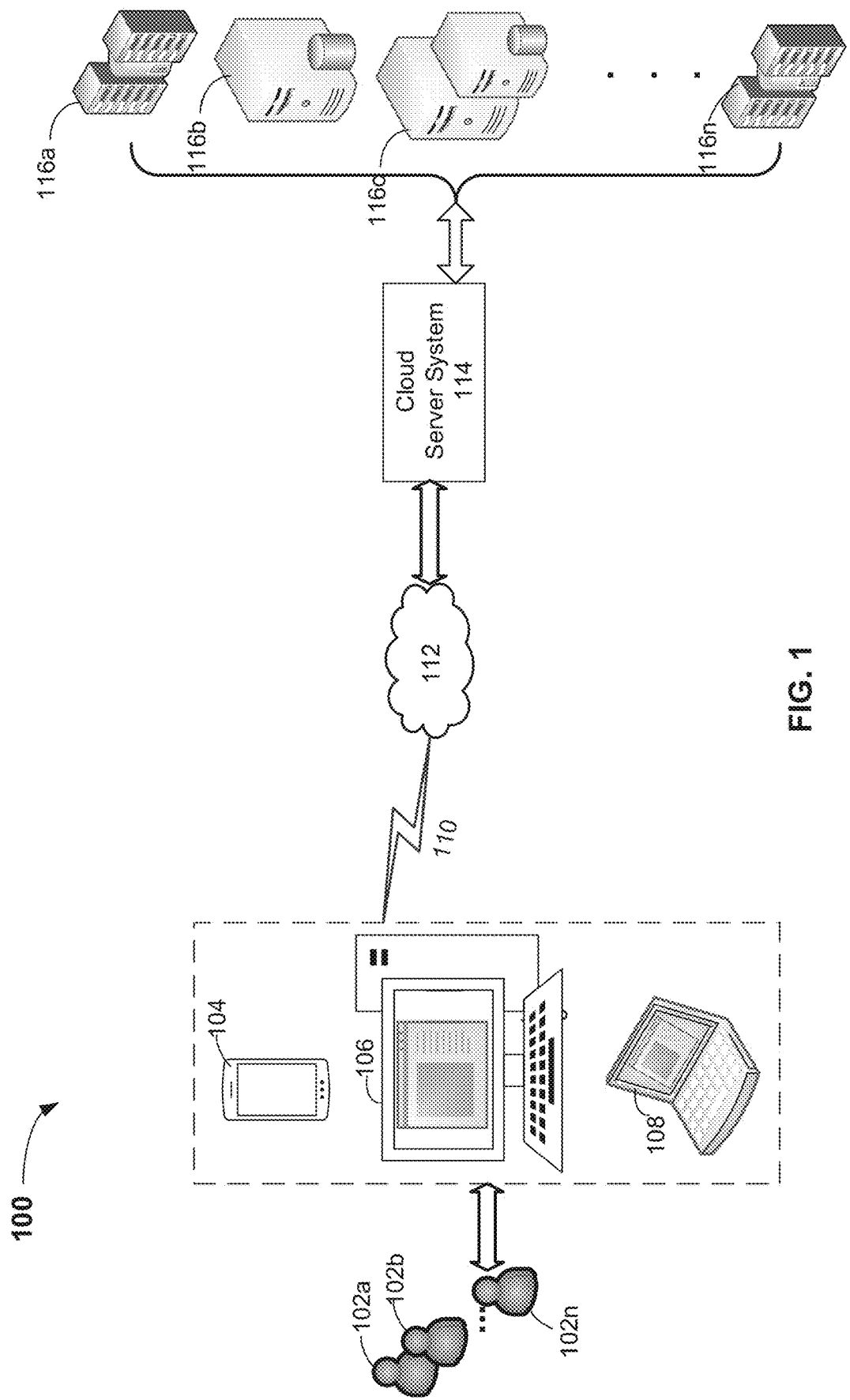
FIG. 1 illustrates an overall architecture of a Cloud-based computing system equipped with computer vision and machine learning capabilities to automatically perform ergonomics risk identification and assessment of a number of hand grips, according to an exemplary aspect of the present disclosure.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the present disclosure. It may be evident in some or all instances, however, that any aspects described below can be practiced without adopting the specific design details described below.

Referring to FIG. 1, in accordance with aspects of the present disclosure, a system 100 deployed within a Cloud-based (and/or server-based) computing environment and communication network may be configured to provide relevant stakeholders 102a, 102b . . . 102n (e.g., employers, safety professionals, etc.) with an ergonomics risk identification and assessment of a number of hand grips based on video recordings of workers performing various hand-related tasks in any industrial setup. As will be described fully below, to alleviate the prevalence of hand-related MSDs, system 100 may be configured to accurately identify various risky hand grips by workers handling tools with, for example, only an ordinary camera. System 100 may be configured to continuously identify and localize risky hand grips within given image frames of obtained video recordings of workers handling tools via their hands.

In one embodiment, a user-facing application, which may be a mobile or web-based application (e.g., native iOS or Android Apps), may be downloaded and installed on a selected computing device or system 104, 106 or 108 for obtaining a video of a worker performing a hand-related job and information regarding forces being applied or exerted during the job. Computing device 104, 106 or 108 hosting the mobile or web-based application may be configured to connect, via suitable communication protocol 110 and network 112, with a remote Cloud server system 114 which may be configured to use machine learning based computer vision (e.g., a sensorless motion capture process) technology to analyze one or more image frames of the obtained video recording (FIG. 2(A)) in order to perform at least a three-dimensional (3D) hand pose estimation and a hand grip classification process to identify several grip types (FIG. 2(B)). In one preferred embodiment, as shown in FIG. 2(C), seven grip types may be identified by system 100 of the present disclosure: a cylindrical grip or grasp (e.g., the whole hand of a worker is in contact with an object, and curved with thumb opposition), a diagonal volar grip (e.g., the angle between the plane defined by the thumb phalanges and the symmetry plane of an object is less than 30° and there is contact between the object and the palmar sides of the thumb, the palm and at least three long fingers), a tripod grip (e.g., a grip using three fingers of the hand—the thumb, index and middle finger), a pulp grip or pinch (e.g., force is generated between the pad of the thumb and the pad of one or more remaining fingers), a lateral grip (e.g., the thumb opposes the lateral side of another finger), and index pointing (e.g., this grip enables a person to press buttons, ring a doorbell, use a smartphone, or point out directions. The index finger remains extended while other fingers flex in towards the palm, and other-type grip.

It should be appreciated that each of the computing devices or systems 104, 106, 108 may comprise at least one of computing devices, servers, server farms, laptops, tablets, mobile devices, smart phones, smart watches, fitness tracker devices, cellular devices, gaming devices, media players, network enabled printers, routers, wireless access points, network appliances, storage systems, any suitable databases, gateway devices, smart home devices, virtual or augmented reality devices, or any other suitable devices that are deployed in the same or different communication networks of these computing devices and systems. The Cloud server system 114 may be configured to provide functionalities for any connected devices such as sharing data or provisioning resources among multiple client devices, or performing computations for each connected client device. The term "server" generally refers to a computing device or system, including processing hardware and process space(s), an associated storage medium such as a memory device or database, and, in some instances, at least one database application as well known in the art. It should also be understood that "server system" and "server" are often used interchangeably herein.

In one embodiment, computing devices 104, 106, 108 and any connected computing devices of the system 100 may be configured to communicate with the Cloud server system 114 via a communication network 112 using suitable network connections and protocols 110. A communication network (e.g., communication network 112) may refer to a geographically distributed collection of computing devices or data points interconnected by communication links and segments for transporting signals and data therebetween. A protocol (e.g., protocol(s) 110) may refer to a set of rules defining how computing devices and networks may interact with each other, such as frame relay, internet protocol (IP), transmission control protocol (TCP), user datagram protocol (UDP), hypertext transfer protocol (HTTP). Many types of communication networks are available, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network. Computing devices 104, 106 and 108 may be configured to communicate in a peer to peer manner to replace, duplicate, supplement or extend the functionalities of communication network 112.

In one aspect, the Cloud server system 114 of the present disclosure may be configured to provide various computing services using shared resources. Cloud computing may generally include Internet-based computing in which computing resources are dynamically provisioned and allocated to each connected computing device or other devices on-demand, from a collection of resources available via the network or the Cloud. Cloud computing resources may include any type of resource, such as computing, storage, and networking. For instance, resources may include service devices (firewalls, deep packet inspectors, traffic monitors, load balancers, etc.), computing/processing devices (servers, CPUs, GPUs, random access memory, caches, etc.), and storage devices (e.g., network attached storages, storage area network devices, hard disk drives, solid-state devices, etc.). In addition, such resources may be used to support virtual networks, virtual machines, databases, applications, etc. The term "database," as used herein, may refer to a database (e.g., relational database management system (RDBMS) or structured query language (SQL) database), or may refer to any other data structure, such as, for example a comma separated values (CSV), tab-separated values (TSV), JavaScript Object Notation (JSON), eXtendible markup language (XML), TeXT (TXT) file, flat file, spreadsheet file, and/or any other widely used or proprietary format. In some embodiments, one or more of the databases or data sources may be implemented using one of relational databases, flat file databases, entity-relationship databases, object-oriented databases, hierarchical databases, network databases, NoSQL databases, and/or record-based databases.

Within the system 100, Cloud computing resources accessible via any suitable communication network (e.g., Internet) may include a private Cloud, a public Cloud, and/or a hybrid Cloud. Here, a private Cloud may be a Cloud infrastructure operated by an enterprise for use by the enterprise, while a public Cloud may refer to a Cloud infrastructure that provides services and resources over a network for public use. In a hybrid Cloud computing environment which uses a mix of on-premises, private Cloud and third-party, public Cloud services with orchestration between the two platforms, data and applications may move between private and public Clouds for greater flexibility and more deployment options. Some example public Cloud service providers may include Amazon (e.g., Amazon Web Services® (AWS)), IBM (e.g., IBM Cloud), Google (e.g., Google Cloud Platform), and Microsoft (e.g., Microsoft Azure®). These providers provide Cloud services using computing and storage infrastructures at their respective data centers and access thereto is generally available via the Internet. Some Cloud service providers (e.g., Amazon AWS Direct Connect and Microsoft Azure ExpressRoute) may offer direct connect services and such connections typically require users to purchase or lease a private connection to a peering point offered by these Cloud providers.

The Cloud server system 114 of the present disclosure may be configured to connect with various data sources or services 116a, 116b, 116c, . . . 116n. For example, one of the data sources or services 116a, 116b, 116c, . . . 116n may comprise an artificial intelligence based diagnostic system or an expert or knowledge based diagnostic or evaluation system for providing or optimizing recommendations for addressing any identified risky hand grips and such recommendations may include text, audio, video, and other rich media explanations.

Figure 3:
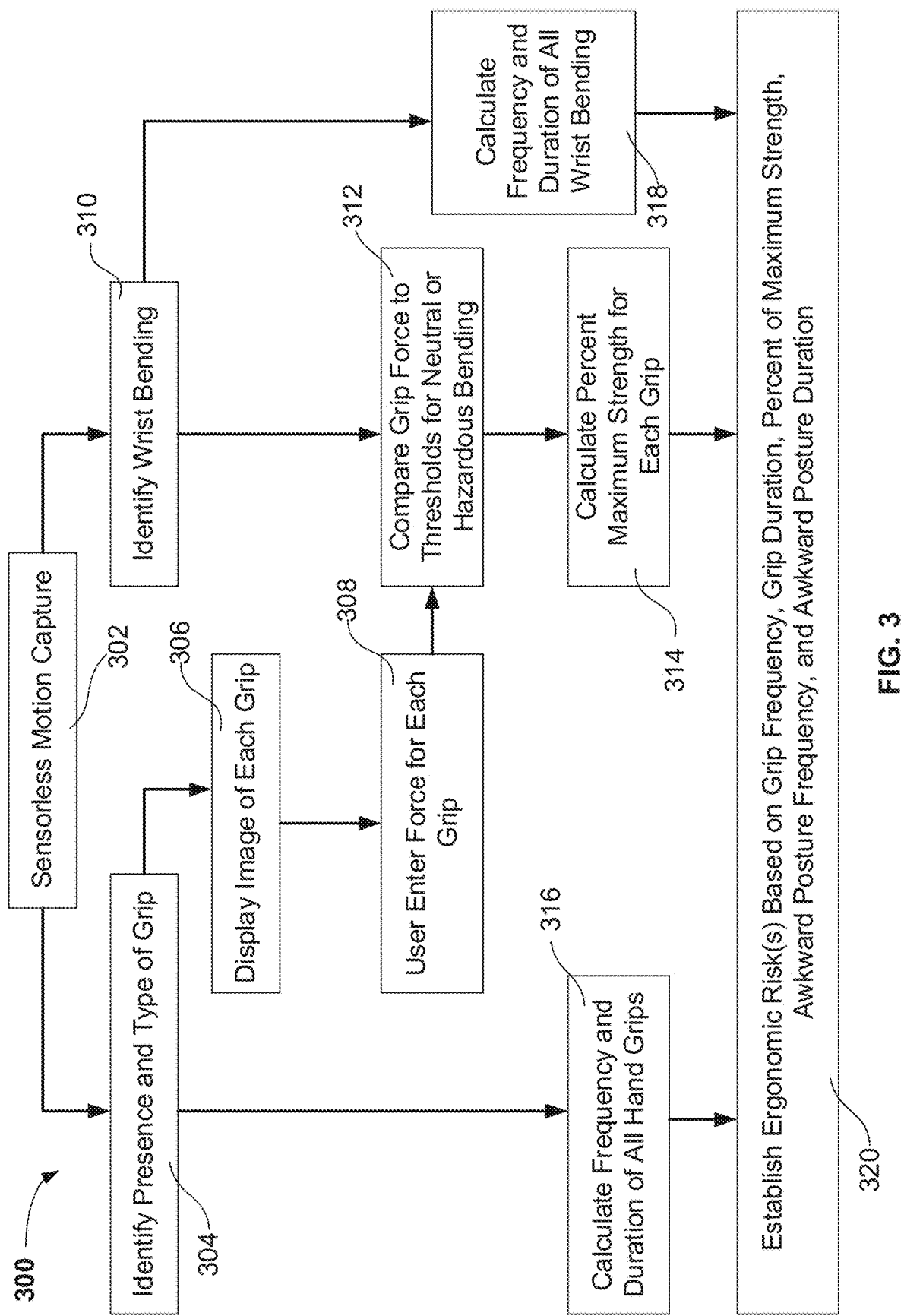
FIG. 3 illustrates an overall workflow of the system of FIG. 1, according to an exemplary aspect of the present disclosure.
Figure 5A:
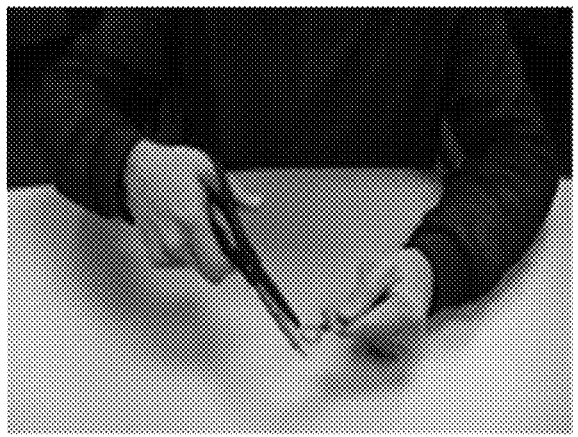
FIG. 5(A) illustrates an example image obtained from a video recording a worker sitting and handling tools via his hands on a table, according to an exemplary aspect of the present disclosure.
Figure 5B:
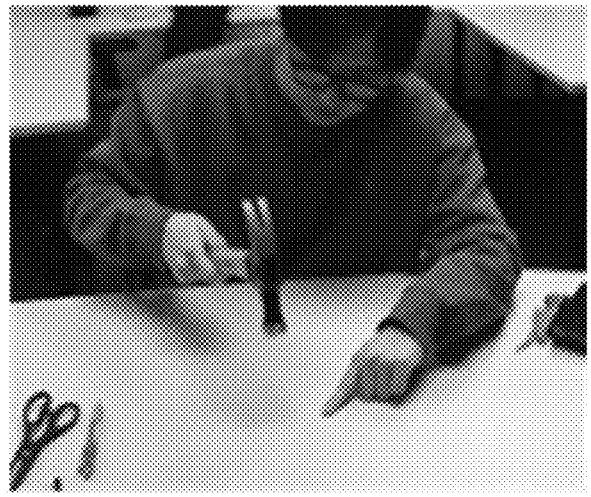
FIG. 5(B) illustrates another example image obtained from a video recording an upper body of a worker sitting and handling tools via his hands on a table, according to an exemplary aspect of the present disclosure.
Figure 5C:
FIG. 5(C) illustrates yet another example image obtained from a video recording a worker standing and handling tools via his hands on a table, according to an exemplary aspect of the present disclosure.
Figure 5D:
FIG. 5(D) illustrates an additional example image obtained from a video recording an upper body of a worker standing and handling tools via his hands on a table, according to an exemplary aspect of the present disclosure.
Figure 6A:
FIG. 6(A) illustrates an example image obtained from a video recording a worker sitting and handling tools on a wall with his hands at chest height, according to an exemplary aspect of the present disclosure.
Figure 6B:
FIG. 6(B) illustrates another example image obtained from a video recording an upper body of a worker sitting and handling tools on a wall with his hands at eye height, according to an exemplary aspect of the present disclosure.
Figure 6C:
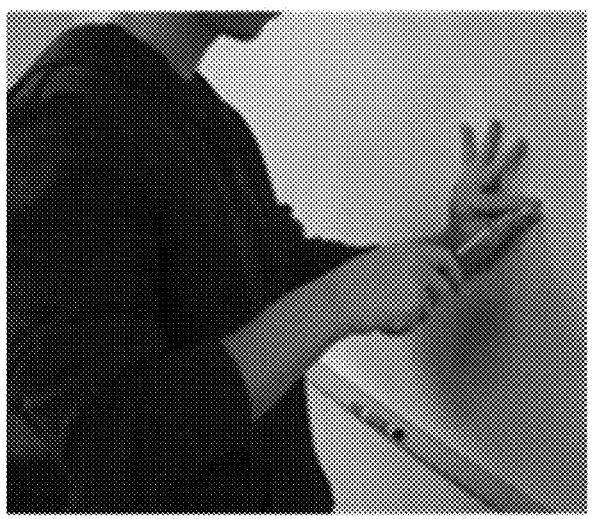
FIG. 6(C) illustrates yet another example image obtained from a video recording a worker standing and handling tools on a wall with his hands at chest height, according to an exemplary aspect of the present disclosure.
Figure 6D:
FIG. 6(D) illustrates an additional example image obtained from a video recording an upper body of a worker standing and handling tools with his hands at eye height, according to an exemplary aspect of the present disclosure.

FIG. 3 illustrates an example overall workflow 300 of a hand grip identification system 100 of the present disclosure. Input data required by the system 100 may include video signals showing a worker performing a job using his/her hand(s). In a preferred embodiment, a sensorless motion capture process 302 may be carried out by the system 100 via only one ordinary camera for obtaining the video signals. The system 100 may be configured to utilize computer vision technology and machine learning algorithms to process the video signals and identify 304 the presence and types of the hand grips via one or more image frames of the video signals, as shown in FIGS. 2(B) and 2(C). For example, referring back to FIG. 1, the user-facing application of the system 100 may include a plurality of modules executed and controlled by the processor of the hosting computing device or system 104, 106 or 108 for obtaining, analyzing and processing a video. In one example, a video receiving/communication interface module (not shown) of the user-facing application may prompt the user of the system 100 to directly record a video of a worker performing a series of work activities via the hosting computing device or system 104, 106 or 108. In another example, the video receiving/communication interface module may be configured to receive video signals via, e.g., a universal serial bus (USB) connector (e.g., USB-A, USB-B, USB-B Mini, USB-B Micro, USB-C, USB4, Lightning) or any suitable ports or connectors, from external sources (e.g., any suitable video file storage devices or video players such as CD/DVD disc players, digital cameras and sensors, web cameras, or any suitable computing devices and imaging devices with video recording capabilities). In some embodiments, the video receiving/communication interface module may be configured to receive video transmission signals in both analog and digital formats. Further, the user-facing application may use a control module (e.g., processor/microprocessor of the hosting computing device or system 104, 106 or 108) to identify the file format of the received video and determine whether the video is eligible for motion capture processing (e.g., 3D hand pose estimation as shown in FIG. 2(B)).

In certain embodiments, a video format converting module (not shown) may be implemented for converting the format of video signals originally received by the video receiving interface module into digital video files in a targeted format required by the Cloud server system 114 for further processing. The system 100 of the present disclosure may process and convert video files in various formats including but not limited to MP4 (MPEG-4 Part 14), MOV (QuickTime Movie), WMV (Windows Media Viewer), AVI (Audio Video Interleave), AVCHD (Advanced Video Coding High Definition), flash video formats FLV, F4V, and SWF (Shockwave Flash), MKV, WEBM or HTML5, and MPEG-2. In some implementations, the video receiving/communication interface module may transmit the obtained video signals to the Cloud server system 114 or any of external data services 116a, 116b, 116c, . . . 116n for an initial verification whether the video is eligible for motion capture processing (e.g., 3D hand pose estimation as shown in FIG. 2(B)) and/or format conversion. For example, a number of parameters may be checked during the initial verification process: the resolution of the video recording; the bitrate of the video recording; the duration of the video recording; the file size of the video recording; and the format of the video recording.

To facilitate bi-directional communication, the video receiving/communication interface module of the user-facing application may also be used to receive the stream of video signals transmitted from one or more multimedia data processing sources (e.g., the Cloud server system 114 or any of external data services 116a, 116b, 116c, . . . 116n), save the received video signals locally on the hosting computing device or system 104, 106 or 108, and/or transmit the received video signals to other computing devices deployed within the system 100.

As shown in FIG. 3, the system 100 may be configured to display 306 at least one image of each identified hand grip to the user and calculate 316 the frequency and duration of all identified hand grips based on the video signals. Frequency may be referred to as the number of occurrences of specific hand grip types per minute. When a same hand grip type is consistently identified across image frames for more than 1 second (e.g., 30 frames in a 30 frames per second (FPS) video), it may be determined as a single occurrence of that grip type. To compute the frequency, the total number of occurrences of hand grip types may be divided by the overall video duration in minutes. Duration of each hand grip type may be calculated in seconds by counting the number of image frames of the identified hand grip types. Dividing the frame count of hand grip types by the frame rate of a video (e.g., 30 frames per second) may result in an estimated duration of certain hand grip types in seconds.

If there is any force involved in the recorded work task, the user may be prompted to enter 308 relevant force information for each identified hand grip. In the meantime, information obtained via the sensorless motion capture process 302 may be used to identify 310 wrist bending of the user in handling certain tools in the recorded video signals. Subsequently, system 100 may be configured to compare 312 grip force provided by the user to a plurality of thresholds indicating neutral or hazardous wrist bending and calculate 314 percent maximum strength for each identified hand grip accordingly. Different threshold values of a grip force may be applied to a number of different hand grip types by considering the distinct muscle groups and biomechanics, which may allow different levels of grip force. In some implementations, different threshold values may be determined by considering anthropometric studies regarding human capability limits for different grips types, variations in strength capabilities based on changes in wrist postures and potential muscular fatigue associated with the frequency and/or duration of a hand grip. For example, a force threshold of 2 lb (0.9 kg) may be used as threshold values for repetitive pulp grips with deviated wrist postures, while that force threshold increases to 3.2 lb (1.4 kg) if the wrist is in a biomechanically neutral posture. In the case of a cylindrical grip, example force thresholds may be 6.4 lb (2.9 kg) and 12.7 lb (5.8 kg) for deviated and neutral wrist postures, respectively.

In addition, the system 100 may be configured to calculate 318 the frequency and duration of all identified wrist bending positions based on the obtained video signals. Frequency may be represented by the number of occurrences of a wrist bending per minute. When a wrist bending is consistently identified across image frames over 1 second (e.g., 30 frames in a 30 FPS video), it may be determined as a single occurrence of the wrist bending. To compute the frequency, the total number of occurrences of wrist bending may be divided by the overall video duration in minutes. Duration of a wrist bending may be calculated in seconds by counting the number of image frames of the identified wrist bending. Dividing the frame count of identified wrist bending by the frame rate of a video (e.g., 30 frames per second) may result in the estimated duration of the wrist bending in seconds.

As will be described fully below, in one embodiment, the Cloud server system 114 may be configured to establish 320 ergonomic risk(s) for one or more identified hand grips based on determined hand grip frequency, hand grip duration, percent of maximum strength, awkward posture frequency, and awkward posture duration. Ergonomic risk may be established based on, e.g., a grip frequency, a grip duration, a percent of maximum strength, an awkward posture frequency, and an awkward posture duration. For example, the number of hazardous conditions may be identified and counted, and the counted number may be assessed to score the level of the current ergonomic risks (e.g., low (0 or 1), medium (2), and high (3, 4, or 5)).

In some implementations, a list of risk controls that mitigate the identified risky hand grips may be provided to the user who can further select the appropriate corrective risk control actions.

In accordance with aspects of the present disclosure, video signals of workers handling tools have been collected to at least train and validate a hand grip classifier of the hand grip identification system 100. In one study, 11 participants were filmed handling various tools. The participants include 7 men and 4 women, all of whom had different physical characteristics (e.g., sizes of hands and strength) and experiences of using tools, in order to monitor the hand grips of a wide range of people. The 11 participants were divided into two groups. Eight participants (5 men and 3 women) were assigned to a training group, from which video signals were collected for training and validating the hand grip classifier of system 100, as shown in FIG. 2(C). The remaining 3 participants (2 men and 1 woman) were assigned to a test group, from which video signals were collected to test the overall hand grip identification system 100.

As shown in the table of FIG. 4, 14 activities may be recorded for collecting video signals of handling various tools with different hand grips and body postures by the participants. Among them, seven activities 402 may represent real-world scenarios of handling various tools, such as hammers, drills, and drivers. For example, the #4 of activities 402 may require a participant use his/her thumb and index fingers of the left hand to hold a wire (i.e., a pulp grip) and place the thumb of the right hand in one loop of scissors and the index and middle fingers in the other loop of the scissors (i.e., a lateral grip). Seven random movement activities 404 were recorded by the system 100 to analyze variations of hand postures while a specific participant was maintaining the same hand grips. In one embodiment, the video signals collected from the random movement activities 404 may be used for training the hand grip classifier of the system 100 along with videos from the handling tool activities 402. Training the hand grip classifier of the system 100 using the grips with variations may improve accuracy as well as robustness to unseen variations, resulting in better generalizability.

Figure 7A:
FIG. 7(A) illustrates that an example image obtained from a video recording a worker handling tools via his hands from a frontal perspective, according to an exemplary aspect of the present disclosure.
Figure 7B:
FIG. 7(B) illustrates an example image obtained from a video recording a worker handling tools via his hands from a backward perspective, according to an exemplary aspect of the present disclosure.
Figure 8A:
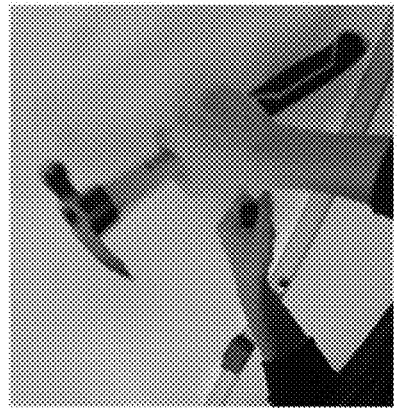
FIGS. 8(A) and 8(B) illustrate additional example images captured from the frontal perspective and FIGS. 8(C) and 8(D) illustrate additional example images captured from the backward perspective of FIGS. 7(A) and 7(B), respectively, according to an exemplary aspect of the present disclosure.
Figure 8B:
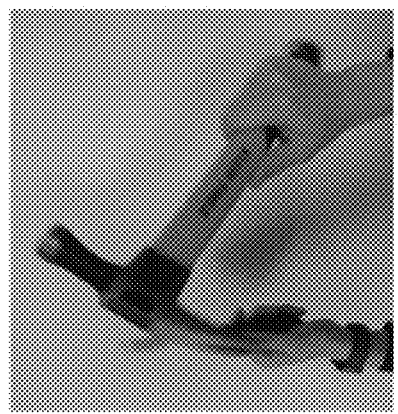
Figure 8C:
Figure 8D:

In this study, training videos were collected from the 8 participants of the training group, while they conducted various hand-related activities. Each activity was repeated to record hand grips under different conditions, including different body postures and different camera angles. Each of the seven activities of handling tools (e.g., activities 402 of FIG. 4) was repeated and recorded in eight different conditions (i.e., a total of 56 videos). In one embodiment, these conditions may include sitting or standing while handling tools on the table, as shown in FIGS. 5(A)-5(D), and sitting or standing while handling tools on the wall, as shown in FIGS. 6(A)-6(D). When the activities were performed on the table, the system 100 may be configured to record the activities by zooming in on the hands (e.g., FIG. 5(A)) or capturing the entire upper body including the shoulder and upper arms (e.g., FIG. 5(B)) of a specific participant. When the activities were performed on the wall, the height of the hands was either at chest height (e.g., FIGS. 6(A) and 6(C)) or at eye height (e.g., FIGS. 6(B) and 6(D)). Additionally, the seven random movement activities 404 of FIG. 4 may be recorded in two different conditions (i.e., a total of 14 videos), a frontal view as shown in FIG. 7(A), and a backward view as shown in FIG. 7(B). Although these random movement activities were recorded in two different conditions, system 100 of the present disclosure may be configured to capture a variety of different postures from different camera angles, as shown in FIGS. 8(A)-8(D). Specifically, FIGS. 8(A) and 8(B) show frontal views and FIGS. 8(C) and 8(D) show backward views of these random movement activities.

From the eight people of the training group, 560 videos were collected. Each video was around 30 seconds long and was recorded by using either a camera associated with a mobile phone or an action camera, which captured 30 FPS. The 560 videos were around 423 minutes long in total and contained around 60 minutes of each identified hand grip, as shown in FIG. 9. The system 100 collected 760,588 image frames from these videos.

The three people of the test group did not conduct the random movement activities 404 of FIG. 4, but only conducted the seven activities of handling tools 402, which represent the real-world scenario of using tools. Each activity was repeated for eight conditions (i.e., a total of 56 videos), similar to that of FIGS. 5(A)-5(D) and 6(A)-6(D). Overall, 168 test videos were collected. Each test video was recorded for 30 seconds by using a camera associated with a mobile phone or an action camera, which captured 30 FPS. The 168 videos were around 115 minutes long in total and contained around 16 minutes of each identified hand grip, as shown in FIG. 9. These videos include a total of 206,296 image frames.

In accordance with aspects of the present disclosure, the system 100 may perform 3D hand pose estimation based on deep learning algorithms. For example, training videos may be processed by the Cloud server system 114 of system 100 to collect the hand grip data for developing the hand grip classifier. For example, the 760,588 image frames from the 560 training videos were used to estimate the 3D hand posture data.

In one aspect, the Cloud server system 114 may include a palm detection module and a hand landmark module. The term "module" as used herein refers to a real-world device, component, or arrangement of components and circuitries implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special purpose device. A module may also be implemented as a combination of the two, with certain functions facilitated by hardware alone, and other functions facilitated by a combination of hardware and software. Each module may be realized in a variety of suitable configurations, and should not be limited to any example implementation exemplified herein.

The palm detection module may be configured to detect hand locations in an image, as shown in FIGS. 10(A), and the hand landmark module may be configured to estimate the 3D coordinates of 21 hand joints of the detected hands. As shown in FIG. 10(B), joint #0 may correspond to the wrist, joint #1 corresponding to thumb carpometacarpal joint, joint #2 corresponding to thumb metacarpophalangeal joint, joint #3 corresponding to thumb interphalangeal joint, joint #4 corresponding to thumb tip, joint #5 corresponding to index finger metacarpophalangeal joint, joint #6 corresponding to index finger proximal interphalangeal joint, joint #7 corresponding to index finger distal interphalangeal, joint #8 corresponding to index finger tip, joint #9 corresponding to middle finger metacarpophalangeal joint, joint #10 corresponding to middle finger proximal interphalangeal joint, joint #11 corresponding to middle finger distal interphalangeal joint, joint #12 corresponding to middle finger tip, joint #13 corresponding to ring finger metacarpophalangeal joint, joint #14 corresponding to ring finger proximal interphalangeal joint, joint #15 corresponding to ring finger distal interphalangeal joint, joint #16 corresponding to ring finger tip, joint #17 corresponding to pinky finger metacarpophalangeal joint, joint #18 corresponding to pinky finger proximal interphalangeal joint, joint #19 corresponding to pinky finger distal interphalangeal joint, joint #20 corresponding to pinky finger tip. In one embodiment, the Cloud server system 114 may process around 8 FPS without requiring graphical processing units (GPUs), which may enable the real-time estimation of hand joints from image frames collected for a typical FPS between 15 and 30.

The Cloud server system 114 may set up a selected number of parameters (e.g., 4 parameters) including but not limited to the maximum number of hands, model complexity, minimum detection confidence, and minimum tracking confidence. Minimum detection tracking confidence may generally refer to the minimum confidence score for hand detection to be considered successful by the palm detection module. Minimum tracking confidence may generally refer to the minimum confidence score for hand tracking to be considered successful. This parameter relates to the bounding box intersection over union (IoU) threshold (e.g., the area of overlap between a ground-truth bounding box specifying where in the image the object is and a predicted bounding box from the hand landmark detection) between hands in the current frame and the last frame. In some embodiments, the Cloud server system 114 may set up the selected parameters as follows:

Maximum number of hands detected by the hand landmark module (between 1 to 4): 2 hands;
Model complexity (light or complex): complex;
Minimum detection confidence (from 0 to 1): 0.5; and
Minimum tracking confidence (from 0 to 1): 0.5.

Thereafter, the 760,588 image frames were input into the Cloud server system 114 to estimate the 3D posture of hands from the obtained video signals, which were used to train and validate a hand grip classifier of the system, as shown in FIG. 2(C). For each image frame, the Cloud server system 114 may determine the X, Y, and Z coordinates of 21 hand joint locations of each detected hand in the frame, as shown in FIGS. 10(A) and 10(B). To collect only quality data for training the hand grip classifier, the Cloud server system 114 may be configured to discard data that failed to detect and estimate hand joints. In one example, as shown in FIG. 11, the Cloud server system 114 may fail to detect the right hand within the selected detection and tracking confidence, the right hand in the image may be ignored and only the left-hand data may be collected from the image. As shown in FIG. 12, 760,588 image frames may be collected from the 560 training videos originally. After identifying and discarding the failed hand detections, the Cloud server system 114 may determine 711,467 hand joint coordinates. The discrepancy before and after discarding the failed cases indicates that the detection rate of the Cloud server system 114 on the training videos was around 93.54% for this study. Generally, hand detection while handling tools is very challenging due to severe occlusion caused by the tools. As shown in FIG. 12, the detection rates of cylindrical and diagonal grips may be lower than that of the other hand grips, as the cylindrical and diagonal grips were recorded while handling large tools, such as drills, hammers, and drivers, which may cause severe occlusions of hands. By contrast, the other grips were recorded while handling small tools like nails, ranches, and pens and no severe occlusion was encountered.

As shown in FIG. 13(A), the raw output of hand joint coordinates calculated by the Cloud server system 114 may have random orientation and was not normalized. The direct use of such unorganized data may not be suitable for hand grip classification. To organize the hand grip data, the aforementioned 711,467 hand joint coordinates may be post-processed by the Cloud server system 114 in order to transform the coordinates of hand joints to have similar orientations and ranges of values.

In some embodiments, the wrist of the raw 3D coordinates may be translated by the Cloud server system 114 into an origin coordinate (i.e., (0,0,0) in 3D space), as shown in FIG. 13(B). Next, the coordinates may be normalized by assigning the farthest joint distance from the origin as 1, as shown in FIG. 13 (C). The normalized coordinates may then be rotated to align joint #9 on the Z-axis of FIG. 13(D) and to align joint #5 on the Y-axis of FIG. 13(E). In one embodiment, joints #9 and #5 may be selected for the reference points of the transformation since their relative locations may be stationary regardless of hand grips. At this step, the orientations of the left and right-hand joints may be mirrored with respect to the YZ-plane. To align the orientations of the left and the right hand joints with the same orientation, the X coordinates of the hand joints may be replaced by their absolute values for them to be aligned in similar orientations, regardless of the handedness, as shown in FIG. 13(F). As a result of the post-processing, the Cloud server system 114 may transform hand joints of different orientations shown in FIG. 14(A) to have similar orientations shown in FIG. 14(B). The transformed 3D coordinates of hand joints may generate data in suitable format for further processing by the Cloud server system 114 for each hand grip. In certain embodiments, the origin (wrist location) may be discarded to remove data redundancy for each identified hand grip. For this study, 711,467 of 60D hand grip data were collected.

The hand grip classification process and classifier of the system 100 may take the processed hand grip data as an input, and calculate seven confidence values, corresponding to the seven grip types as shown in FIG. 2(C). For example, the composition of the collected dataset for training and validating the classifier is shown in FIG. 15. For training and validating the classifier, the 711,467 input data may be partitioned into 569,175 data (80%) for training and 142,294 data (20%) for validation. Before data partition, the input data may be randomly shuffled to avoid any biases caused by the order of data. In addition, when the data are partitioned, the number of instances for each hand grip type may be maintained to preserve the original distribution.

In some embodiments, the Cloud server system 114 may use a feedforward classifier to process the hand grip data and generate classification confidence corresponding to the seven grip types, each ranging from 0 to 1. The feedforward classifier may include several numbers of dense blocks. Each dense block may include a hidden layer, an activation function, a batch normalization, and dropout layers. For each hidden layer, a regularization term (e.g., L1 or L2 norm) may be used by the Cloud server system 114 to improve the generalizability of the feedforward classifier. L1 regularization, also called a lasso regression, adds the "absolute value of magnitude" of the coefficient as a penalty term to the loss function. L2 regularization, also called a ridge regression, adds the "squared magnitude" of the coefficient as the penalty term to the loss function. To determine the optimal model structure for the classifier, a number of parameters may be determined. In one preferred embodiment, eight parameters may be determined by the Cloud server system 114 running the Bayesian optimization, which is as follows:

The number of dense blocks: 5 blocks;
The number of hidden units for each dense block: 84, 80, 400, 148, and 141;
Dropout rate: 0.09657;
Regularization: L2 with lambda of 0.1794;
Activation function: ReLU;
The order between Batch Norm, Activation, and Dropout: ReLU, Activation, and Dropout;
Learning rate: 0.017998; and
Optimizer: Adadelta.

Subsequently, the feedforward classifier may be trained for 88 epochs and the lowest validation loss was 0.4345 when the epoch was 68 for this study, as shown in FIG. 16. An epoch is a complete iteration through a dataset during the training process of a model. It is used to measure the progress of a model's learning, as the number of epochs increases, the model's accuracy and performance generally improves. FIG. 16 shows that the training and validation losses while training are similar to each other, which indicates that the classifier of system 100 is performing well and is learned generalizable features for classification. It also indicates that the classifier has adequate model complexity for this task and dataset.

In one aspect, probability thresholding may be performed by the Cloud server system 114 as post-processing of the classification results. As a result of the classification, the classification confidence corresponding to the seven grip types may be obtained, which represents the probability of certainty corresponding to these grip types. A threshold may be determined and applied by the Cloud server system 114 to only recognize the grips of high confidence. For example, if a threshold is 0.5, the Cloud server system 114 may identify a hand grip if its classification confidence is greater than 0.5.

Figures 17, 18, 19:
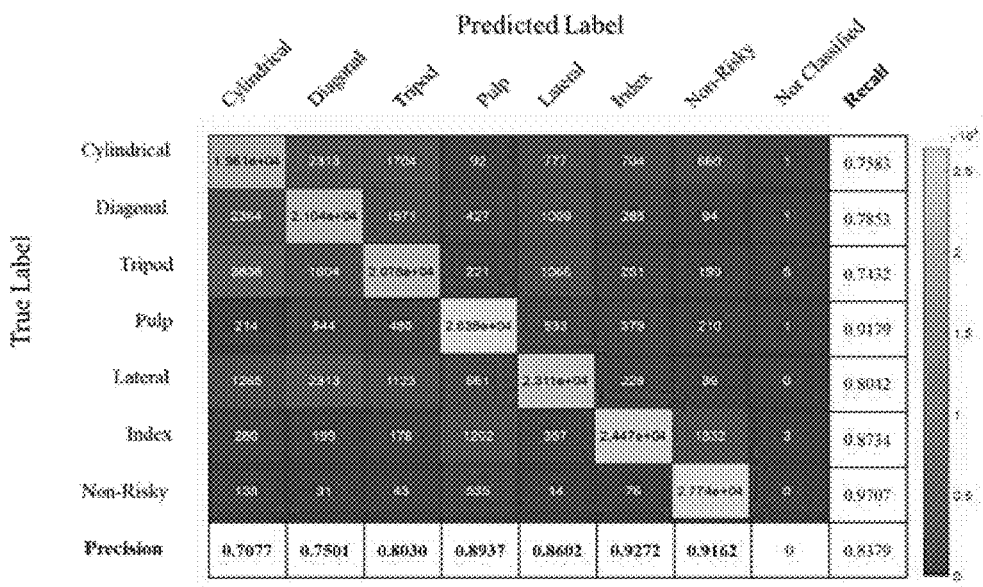
FIG. 17 illustrates an example detection rate of 3D hand pose estimation by the system of FIG. 1 based on a number of obtained videos, according to an exemplary aspect of the present disclosure.
FIG. 18 illustrates several performance parameters of a hand grip identification process by the system of FIG. 1 based on a number of obtained videos, according to an exemplary aspect of the present disclosure.
FIG. 19 illustrates confusion matrix when a threshold of a hand grip classification of the system of FIG. 1 is 0.1, according to an exemplary aspect of the present disclosure.
Figure 20:
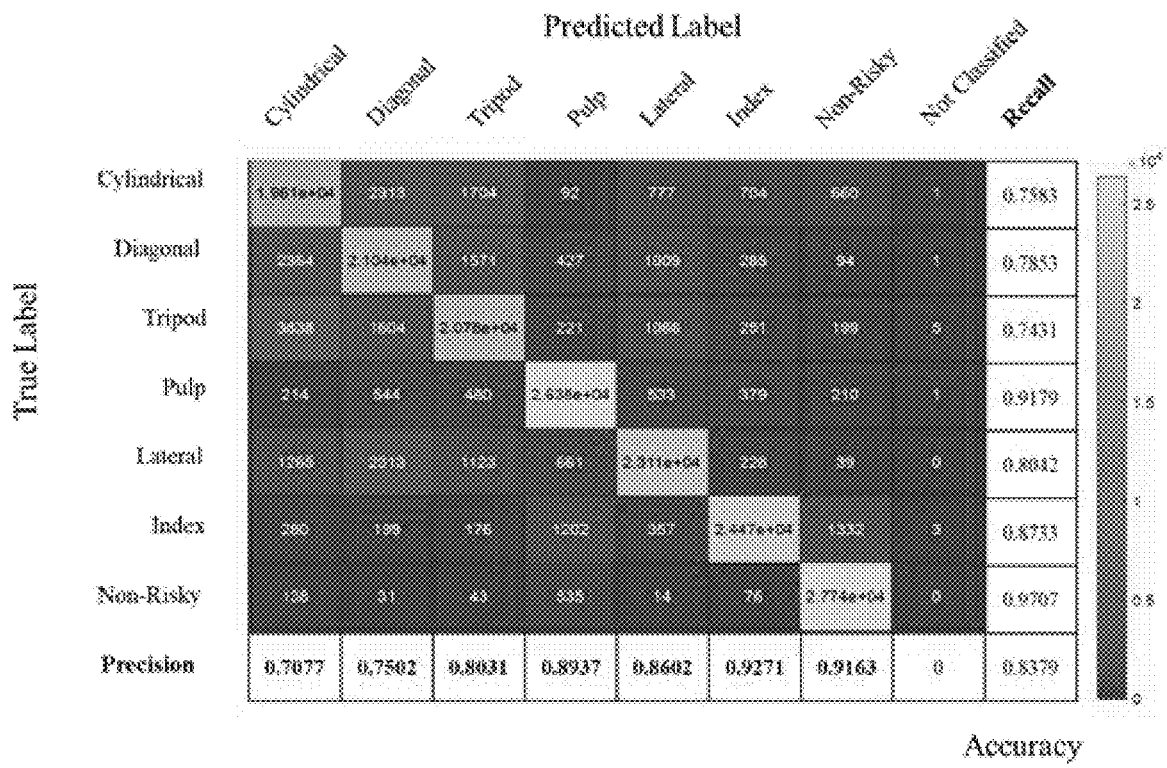
FIG. 20 illustrates confusion matrix when a threshold of a hand grip classification of the system of FIG. 1 is 0.2, according to an exemplary aspect of the present disclosure.
Figure 21:
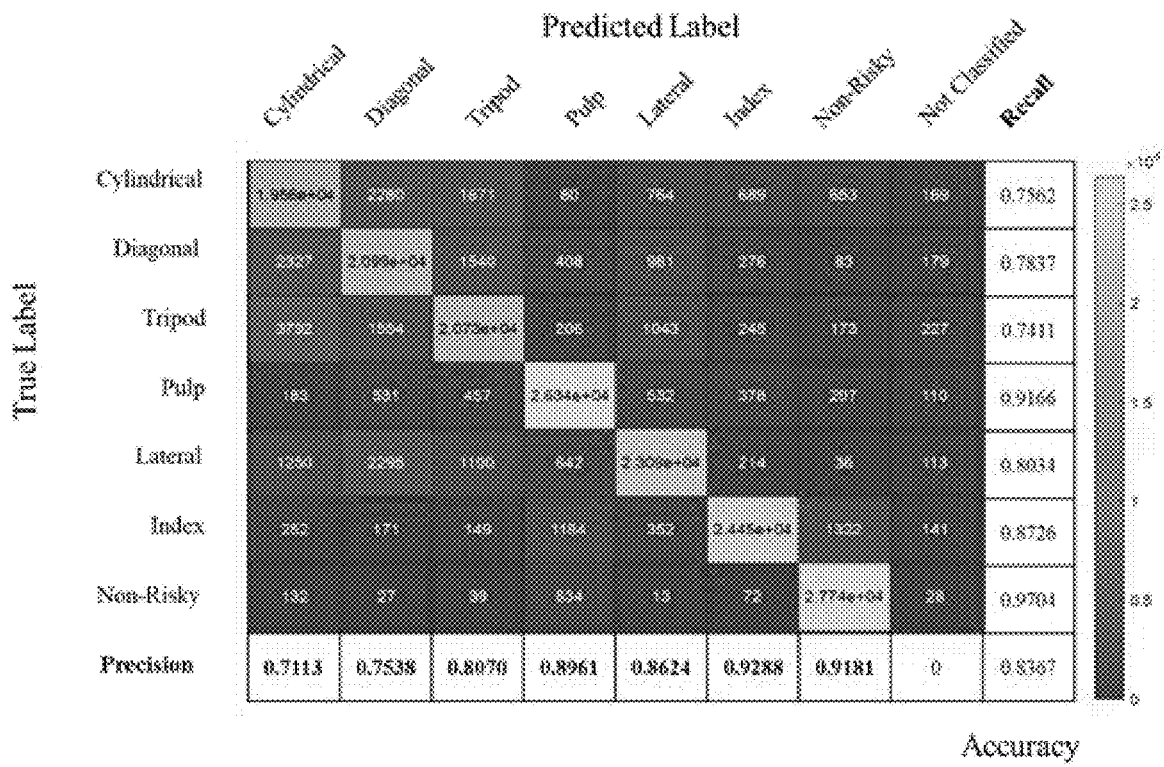
FIG. 21 illustrates confusion matrix when a threshold of a hand grip classification of the system of FIG. 1 is 0.3, according to an exemplary aspect of the present disclosure.

In accordance with aspects of the present disclosure, the overall performance of hand grip identification may be evaluated by the Cloud server system 114 using the videos collected by the three people from the test group. For example, 168 test videos of the study may be used for the evaluation. Originally, the total test videos contained 206, 296 image frames. The number of post-processed hand grip data from the 3D hand pose estimation was 194,706, after discarding the cases in which the Cloud server system 114 failed to detect hands. This indicates that the hand detection rate of the system 100 is 94.38%, as shown in FIG. 17. In some embodiments, when the system 100 is applied to video signals having 30 FPS, detection rate of 3D hand pose estimation may be improved by applying post-processing algorithms (e.g., filters).

FIG. 17 shows that 194,706 hand grip data from 3D hand pose estimation were input into the hand grip classifier, resulting in the final classification confidence, corresponding to the seven risky hand grip types. As post-processing of the hand grip classification, the classification confidence may be thresholded to determine the confidently recognized hand grips.

Figure 22:
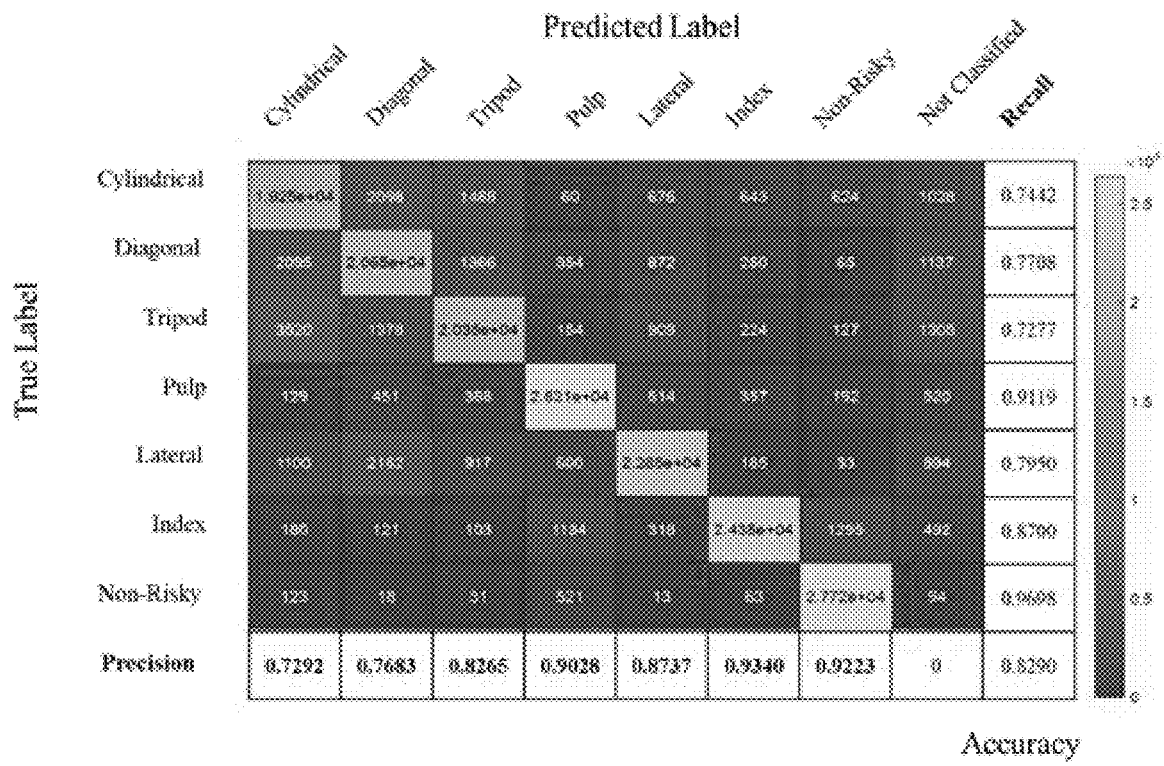
FIG. 22 illustrates confusion matrix when a threshold of a hand grip classification of the system of FIG. 1 is 0.4, according to an exemplary aspect of the present disclosure.
Figure 23:
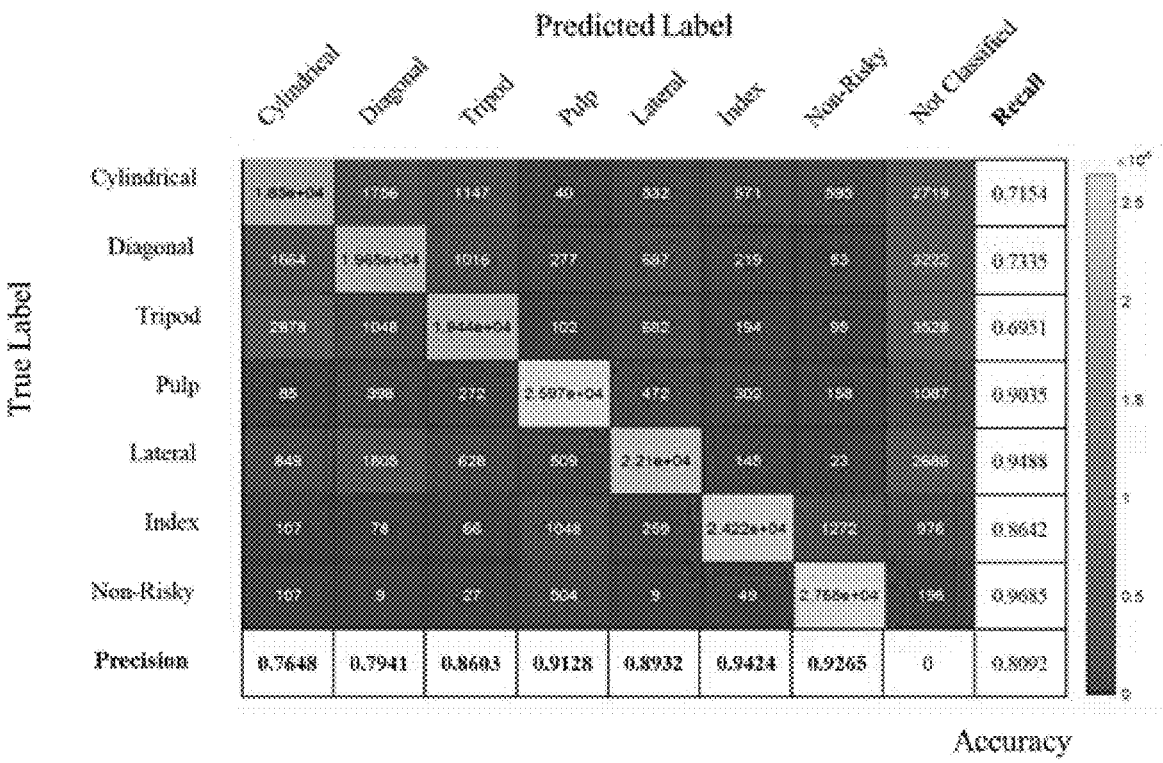
FIG. 23 illustrates confusion matrix when a threshold of a hand grip classification of the system of FIG. 1 is 0.5, according to an exemplary aspect of the present disclosure.
Figure 24:
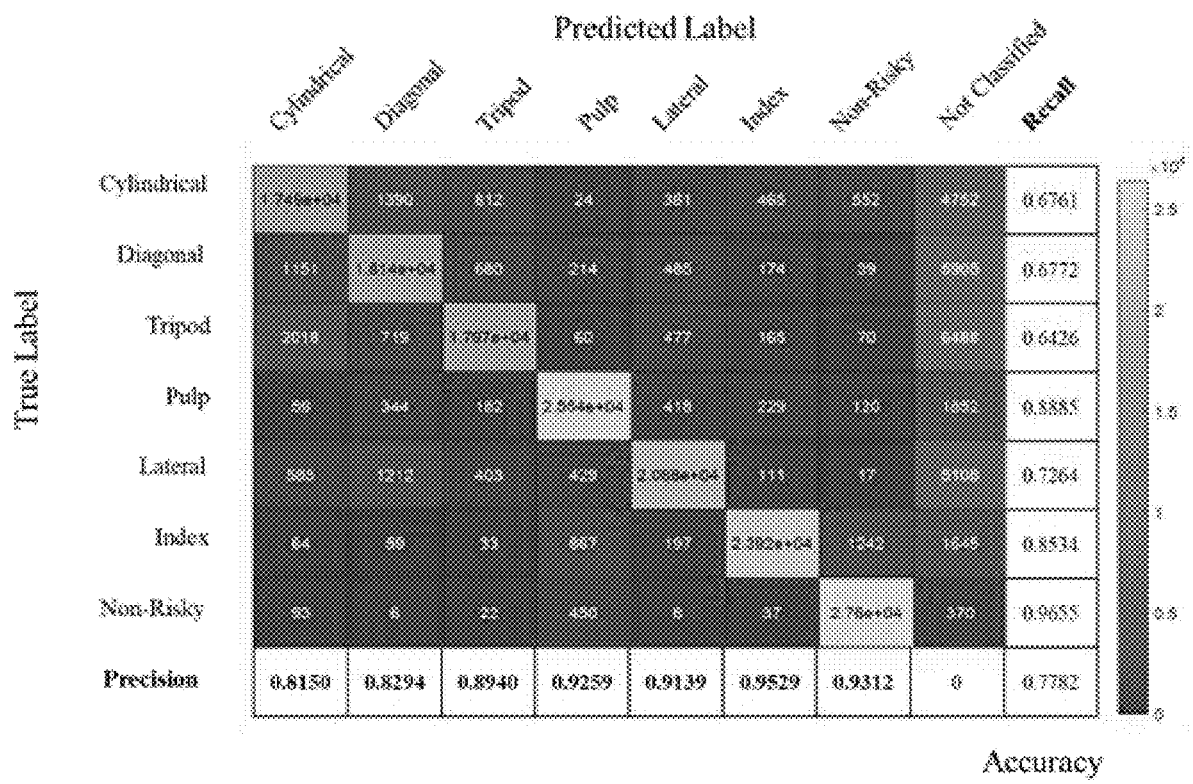
FIG. 24 illustrates confusion matrix when a threshold of a hand grip classification of the system of FIG. 1 is 0.6, according to an exemplary aspect of the present disclosure.
Figure 25:
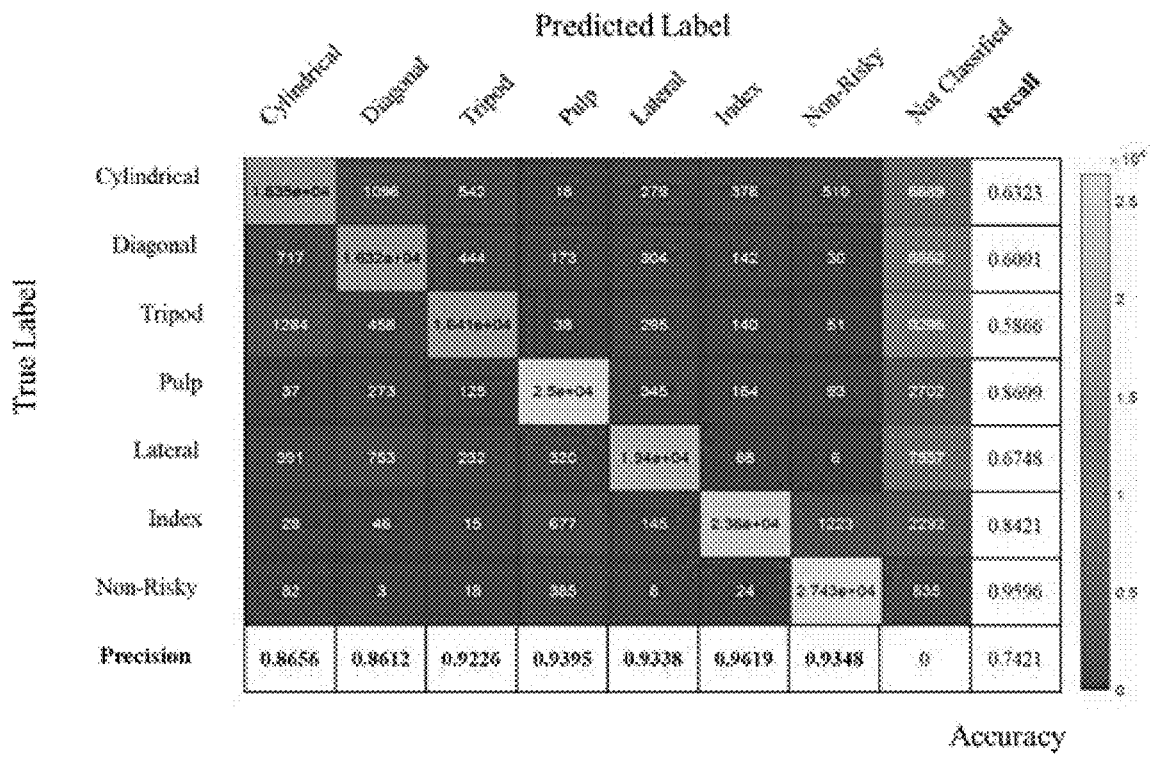
FIG. 25 illustrates confusion matrix when a threshold of a hand grip classification of the system of FIG. 1 is 0.7, according to an exemplary aspect of the present disclosure.
Figure 26:
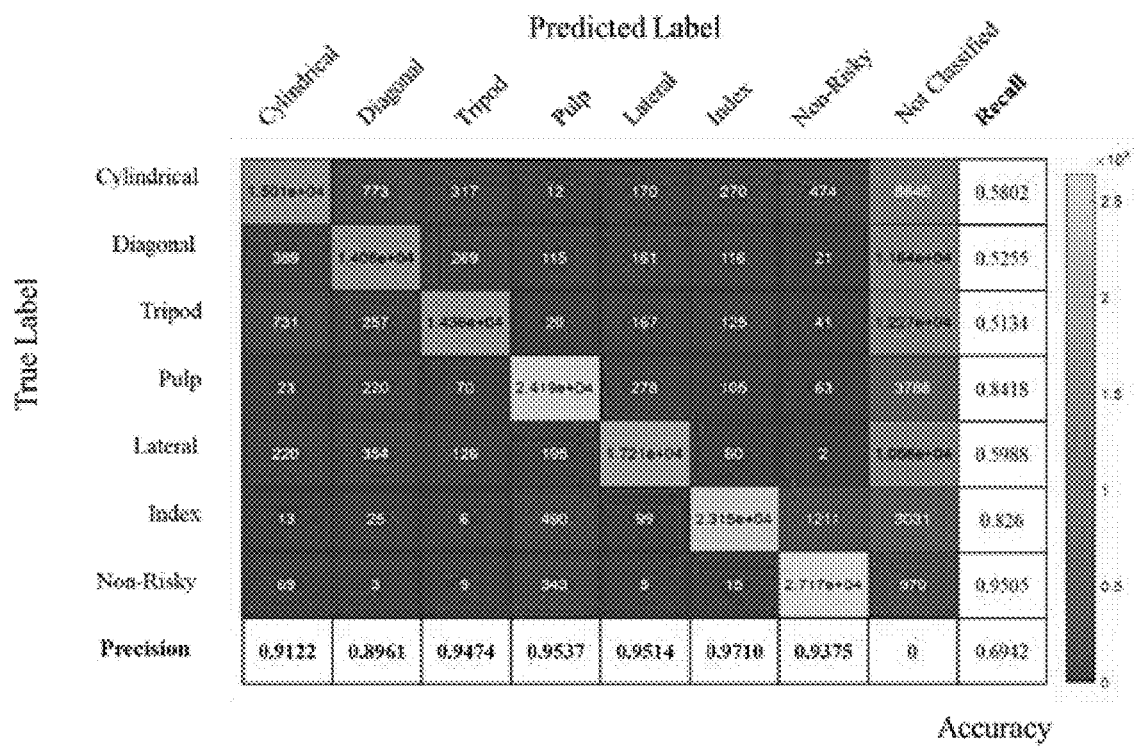
FIG. 26 illustrates confusion matrix when a threshold of a hand grip classification of the system of FIG. 1 is 0.8, according to an exemplary aspect of the present disclosure.
Figure 27:
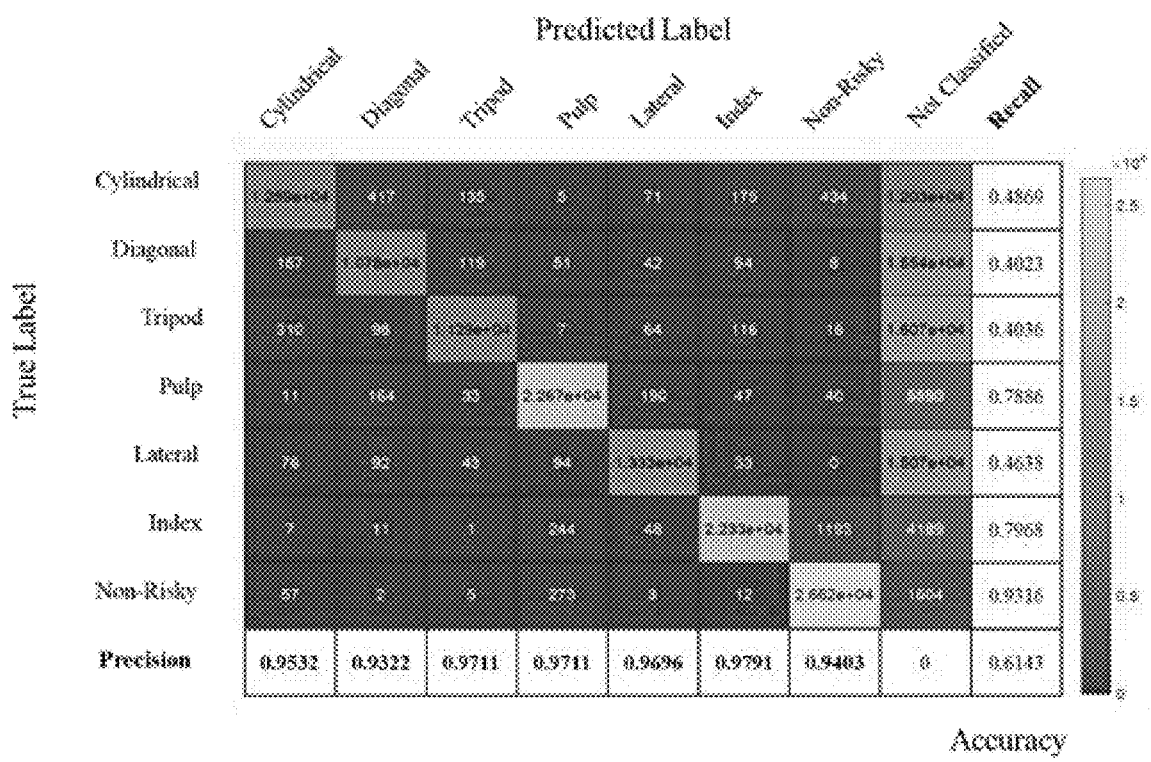
FIG. 27 illustrates confusion matrix when a threshold of a hand grip classification of the system of FIG. 1 is 0.9, according to an exemplary aspect of the present disclosure.

In certain embodiments, the performance of the hand grip identification system 100 of the present disclosure may depend on one or more threshold values for the classification. For a number of threshold values ranging from 0.1 to 0.9, the average recall, precision, and rate of hand grip identified over the total duration may be evaluated by the Cloud server system 114, as shown in FIG. 18. In addition, confusion matrices or error matrices corresponding to the different threshold values may be generated by the Cloud server system 114, as shown in FIGS. 19-27, respectively. Each row of each matrix may represent the instances in an actual class of the seven hand grips, while each column represents the instances in a predicted class for the seven hand grips. Among various threshold values, 0.4 and 0.5 as shown in FIGS. 22 and 23 may be considered the best choices, which achieved high precision (>85%) while achieving fairly good recall (>75%) and rate of recognized duration (around 90%). As shown in the confusion matrices in FIGS. 19-27, cylindrical, diagonal, and tripod grips have consistently lower precision and recall scores compared to those of the other grips, as these grips were performed when people were handling large tools, such as hammers, scissors, drivers, and drills, which caused severe occlusion of hands. In some implementations, applying post-processing algorithms (e.g., filters) by the Cloud server system 114 may minimize such false positive identification and improve detection rate.

In accordance with additional aspects of the present disclosure, the system 100 may be further configured to improve the performance (e.g., precision and recall) of hand grip identification. For example, the Cloud server system 114 may perform suitable post-processing algorithms, develop seven binary classifiers for hand grip classification, and evaluate the performance of the hand grip recognition for the gloved hand activities.

In certain embodiments, the system 100 of the present disclosure may be applied to both online and offline hand grip identification, and post-processing algorithms may be performed for each approach. For offline post-processing, further data tuning and refining may be carried out without any time constraints. Filtering algorithms, such as hole-filling algorithm and median filter, may be used to correct false identifications and fill in unrecognized hand grips with the most likelihood grips.

Moreover, instead of the multi-class classification used in this study as shown in FIG. 2(C), binary classifiers may be generated and used by the Cloud server system 114 to identify different grip types. For example, each binary classifier may classify if a hand grip is either a specific grip or not. Bayesian optimization may be used to determine the optimal model structure for each of the seven hand grip classifiers.

In addition, gloved hand activity is also a common real-world scenario for handling tools. The system 100 of the present disclosure may be configured to continuously identify and localize risky hand grips within one or more image frames of obtained video recordings of workers handling tools via their gloved hands.

Figure 28:
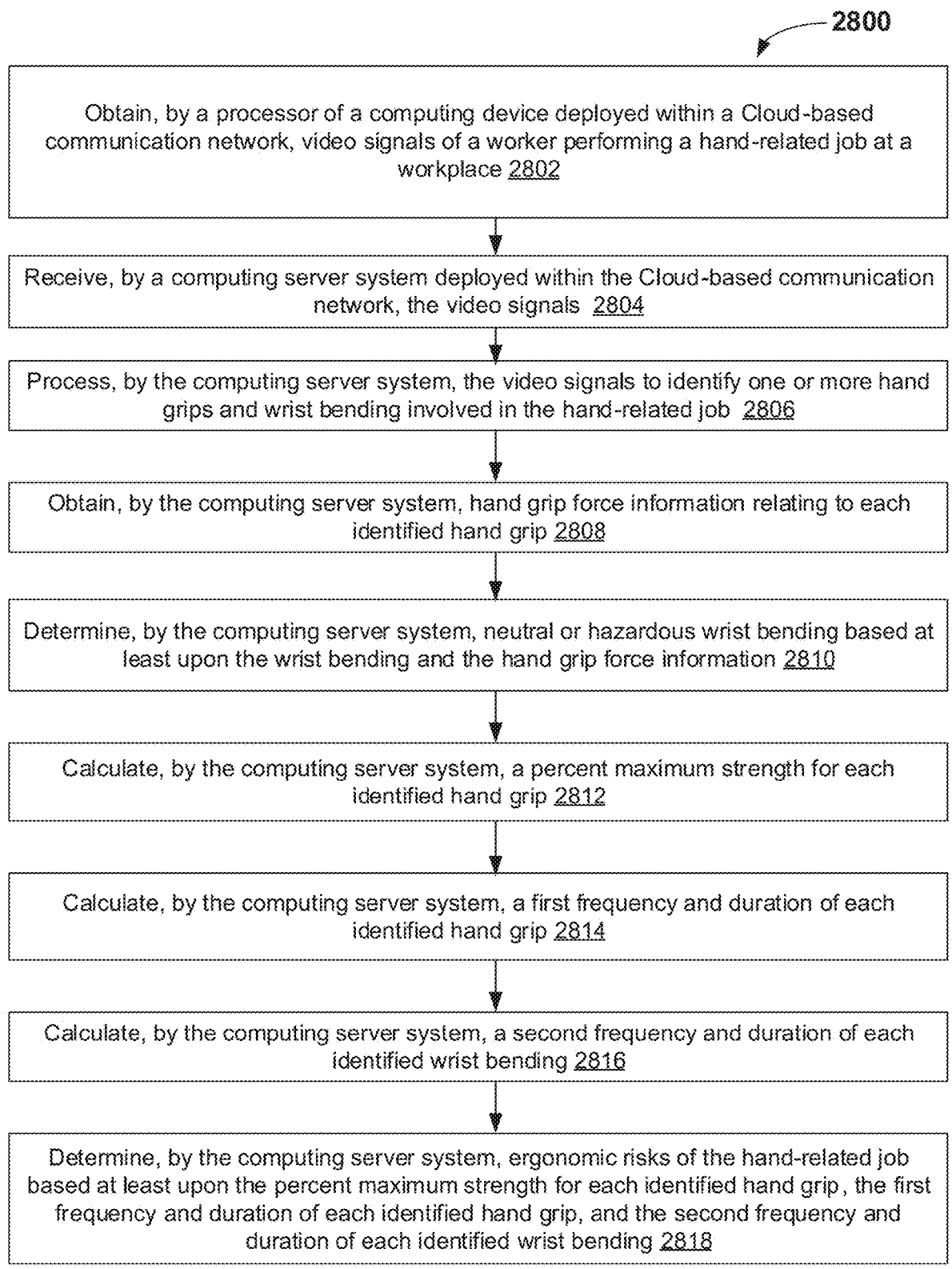
FIG. 28 illustrates a flowchart of a method for identifying industrial ergonomics risk root-causes and providing risk control actions, according to an exemplary aspect of the present disclosure.

According to aspects of the present disclosure, FIG. 28 illustrates a flowchart of a method 2800 for identifying and analyzing a number of hand grips based on video recordings of workers performing various hand-related work tasks in any industrial setup. Method 2800 may comprise obtaining (2802), by a processor of a computing device deployed within a Cloud-based communication network, video signals of a worker performing a hand-related job at a workplace. A computing server system deployed within the Cloud-based communication network may be configured to receive (2804) the video signals and process (2806) the video signals to identify one or more hand grips and wrist bending involved in the hand-related job. In one embodiment, processing the video signals may comprise obtaining one or more image frames from the video signals and using a deep learning model to perform a 3-dimensional hand pose estimation in each image frame. The computing server system may be configured to use the deep learning model to perform a hand grip classification of each identified hand grip in a number of selected categories (e.g., a cylindrical hand grip, a diagonal volar hand grip, a tripod hand grip, a pulp hand grip, a lateral hand grip, an index pointing, and an other-type hand grip).

The method 2800 of the present disclosure also comprises obtaining (2808), by the computing server system, hand grip force information relating to each identified hand grip; determining (2810) neutral or hazardous wrist bending based at least upon the wrist bending and the hand grip force information; and calculating (2812) a percent maximum strength for each identified hand grip.

In addition, the method 2800 comprises calculating (2814, 2816), by the computing server system, frequencies and durations of each identified hand grip and wrist bending; and determining (2818) ergonomic risks of the hand-related job based at least upon the percent maximum strength for each identified hand grip, the first frequency and duration of each identified hand grip, and the second frequency and duration of each identified wrist bending.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A system deployed within a Cloud-based communication network, the system comprising:
a computing device, comprising:
a non-transitory computer-readable storage medium configured to store an application program; and
a processor coupled to the non-transitory computer-readable storage medium and configured to control a plurality of modules to execute instructions of the application program to obtain video signals of a worker performing a hand-related job at a workplace; and
a computing server system configured to:
receive the video signals,
process the video signals to identify one or more hand grips and wrist bending involved in the hand-related job by obtaining one or more image frames from the video signals,
incorporate a deep learning model in a 3-dimensional (3D) hand pose estimation and hand grip classification system to determine a hand grip type of each identified hand grip, wherein the deep learning model is trained and validated by recording a number of hand-related activities to obtain images capturing different hand grips and body postures, determining 3D coordinates of hand joints in each image based at least upon a tracking confidence set for at least one detected hand in sequential images, and normalizing the 3D coordinates of hand joints to calculate confidence values corresponding to a number of hand grips,
obtain hand grip force information relating to each identified hand grip,
determine neutral or hazardous wrist bending based at least upon the wrist bending and the hand grip force information,
calculate a percent maximum strength for each identified hand grip,
calculate a first frequency and duration of each identified hand grip,
calculate a second frequency and duration of each identified wrist bending, and
determine ergonomic risks of the hand-related job based at least upon the percent maximum strength for each identified hand grip, the first frequency and duration of each identified hand grip, and the second frequency and duration of each identified wrist bending.

2. The system of claim 1, wherein the 3D hand pose estimation and hand grip classification system is configured to use the deep learning model to perform a hand grip classification of each identified hand grip in a number of selected categories.

3. The system of claim 2, wherein the number of selected categories include a cylindrical hand grip, a diagonal volar hand grip, a tripod hand grip, a pulp hand grip, a lateral hand grip, an index pointing, and an other-type hand grip.

4. The system of claim 1, wherein the computing server system is further configured to display at least one image of each identified hand grip to a user and prompt the user to enter the hand grip force information relating to each identified hand grip based on the at least one image.

5. The system of claim 1, wherein the computing device is configured to obtain the video signals of the worker performing the hand-related job via a sensorless motion capture process.

6. The system of claim 1, wherein the computing server system is further configured to provide ergonomic risk control recommendations to mitigate the ergonomic risks.

7. A computer-implemented method, comprising:
obtaining, by a processor of a computing device deployed within a Cloud-based communication network, video signals of a worker performing a hand-related job at a workplace;
receiving, by a computing server system deployed within the Cloud-based communication network, the video signals;
processing, by the computing server system, the video signals to identify one or more hand grips and wrist bending involved in the hand-related job by obtaining one or more image frames from the video signals;
incorporating a deep learning model in a 3-dimensional (3D) hand pose estimation and hand grip classification system, by the computing server system, to determine a hand grip type of each identified hand grip, wherein the deep learning model is trained and validated by recording a number of hand-related activities to obtain images capturing different hand grips and body postures, determining 3D coordinates of hand joints in each image based at least upon a tracking confidence set for at least one detected hand in sequential images, and normalizing the 3D coordinates of hand joints to calculate confidence values corresponding to a number of hand grips;
obtaining, by the computing server system, hand grip force information relating to each identified hand grip;
determining, by the computing server system, neutral or hazardous wrist bending based at least upon the wrist bending and the hand grip force information;
calculating, by the computing server system, a percent maximum strength for each identified hand grip;
calculating, by the computing server system, a first frequency and duration of each identified hand grip;
calculating, by the computing server system, a second frequency and duration of each identified wrist bending; and
determining, by the computing server system, ergonomic risks of the hand-related job based at least upon the percent maximum strength for each identified hand grip, the first frequency and duration of each identified hand grip, and the second frequency and duration of each identified wrist bending.

8. The computer-implemented method of claim 7, further comprising using, by the 3D hand pose estimation and hand grip classification system, the deep learning model to perform a hand grip classification of each identified hand grip in a number of selected categories.

9. The computer-implemented method of claim 8, wherein the number of selected categories include a cylindrical hand grip, a diagonal volar hand grip, a tripod hand grip, a pulp hand grip, a lateral hand grip, an index pointing, and an other-type hand grip.

10. The computer-implemented method of claim 7, further comprising:
displaying at least one image of each identified hand grip to a user; and
prompting the user to enter the hand grip force information relating to each identified hand grip based on the at least one image.

11. The computer-implemented method of claim 7, wherein the video signals of the worker performing the hand-related job are obtained via a sensorless motion capture process.

12. The computer-implemented method of claim 7, further comprising providing, by the computing server system, ergonomic risk control recommendations to mitigate the ergonomic risks.

13. A non-transitory computer readable medium storing computer executable instructions for a system deployed within a Cloud-based communication network, the instructions being configured for:
obtaining, by a processor of a computing device deployed within the Cloud-based communication network, video signals of a worker performing a hand-related job at a workplace;
receiving, by a computing server system deployed within the Cloud-based communication network, the video signals;
processing, by the computing server system, the video signals to identify one or more hand grips and wrist bending involved in the hand-related job by obtaining one or more image frames from the video signals;
incorporating a deep learning model in a 3-dimensional (3D) hand pose estimation and hand grip classification system, by the computing server system, to determine a hand grip type of each identified hand grip, wherein the deep learning model is trained and validated by recording a number of hand-related activities to obtain images capturing different hand grips and body postures, determining 3D coordinates of hand joints in each image based at least upon a tracking confidence set for at least one detected hand in sequential images, and normalizing the 3D coordinates of hand joints to calculate confidence values corresponding to a number of hand grips;
obtaining, by the computing server system, hand grip force information relating to each identified hand grip;
determining, by the computing server system, neutral or hazardous wrist bending based at least upon the wrist bending and the hand grip force information;
calculating, by the computing server system, a percent maximum strength for each identified hand grip;
calculating, by the computing server system, a first frequency and duration of each identified hand grip;
calculating, by the computing server system, a second frequency and duration of each identified wrist bending; and
determining, by the computing server system, ergonomic risks of the hand-related job based at least upon the percent maximum strength for each identified hand grip, the first frequency and duration of each identified hand grip, and the second frequency and duration of each identified wrist bending.

14. The non-transitory computer readable medium of claim 13, further comprising instructions for using, by the 3D hand pose estimation and hand grip classification system, the deep learning model to perform a hand grip classification of each identified hand grip in a number of selected categories.

15. The non-transitory computer readable medium of claim 14, wherein the number of selected categories include a cylindrical hand grip, a diagonal volar hand grip, a tripod hand grip, a pulp hand grip, a lateral hand grip, an index pointing, and an other-type hand grip.

16. The non-transitory computer readable medium of claim 13, further comprising instructions for:

displaying at least one image of each identified hand grip to a user; and prompting the user to enter the hand grip force information relating to each identified hand grip based on the at least one image.

17. The non-transitory computer readable medium of claim 13, further comprising instructions for providing, by the computing server system, ergonomic risk control recommendations to mitigate the ergonomic risks, wherein the video signals of the worker performing the hand-related job are obtained via a sensorless motion capture process.

* * * * *